US012807331B2

(12) United States Patent
Bailey et al.

(10) Patent No.: US 12,807,331 B2
(45) Date of Patent: Nov. 24, 2026

(54) ELECTRICALLY OPERATED AIRCRAFT DEICING VEHICLES

(71) Applicant: Textron Sweden AB, Trelleborg (SE)

(72) Inventors: Mark Charles Bailey, Snetterton (GB); James Wyndsor Grealey, Snetterton (GB); Visal Pradeep Kumar, Snetterton (GB)

(73) Assignee: Textron Sweden AB, Trelleborg (SE)

(*) Notice: Subject to any disclaimer, the term of this patent is extended or adjusted under 35 U.S.C. 154(b) by 149 days.

(21) Appl. No.: 19/070,340

(22) Filed: Mar. 4, 2025

(65) Prior Publication Data

US 2025/0289591 A1 Sep. 18, 2025

Related U.S. Application Data

(60) Provisional application No. 63/694,610, filed on Sep. 13, 2024, provisional application No. 63/566,323, filed on Mar. 17, 2024.

(51) Int. Cl.
*B64F 5/23* (2017.01)
*B60K 1/00* (2006.01)
(Continued)

(52) U.S. Cl.
CPC .................. *B64F 5/23* (2017.01); *B60K 1/00* (2013.01); *B60K 11/04* (2013.01); *B60L 1/003* (2013.01); *B60L 50/60* (2019.02); *B60L 58/24* (2019.02)

(58) Field of Classification Search
CPC ... B64F 5/23; B60K 1/00; B60K 11/04; B60L 1/003; B60L 50/60; B60L 58/24
See application file for complete search history.

(56) References Cited

U.S. PATENT DOCUMENTS 8,348,178 B2 1/2013 Svanebjerg et al.
9,259,991 B2 2/2016 Freund et al.
(Continued)

FOREIGN PATENT DOCUMENTS

CN 206900682 1/2018
CN 209700972 11/2019
(Continued)

OTHER PUBLICATIONS

WO-2022252407-A1 Translation (Year: 2022).*
(Continued)

*Primary Examiner* — Kimberly S Berona
*Assistant Examiner* — Steven J Shur
(74) *Attorney, Agent, or Firm* — Lawrence Youst PLLC

(57) ABSTRACT

An electrically operated aircraft deicing vehicle includes a chassis having longitudinally extending beams. The chassis supports a rechargeable battery system including one or more battery modules and a charging unit, front and rear axles, a positioning system for a fluid spraying system and a fluid tank system containing deicing fluid. An electric drive motor is operably coupled to the battery system. The electric drive motor is positioned aft of the front axle and between the longitudinally extending beams of the chassis. The electric drive motor is operable to rotate the front wheels. A hydraulic pump system is powered by the battery system. The hydraulic pump system is operably coupled to the positioning system enabling movement of the fluid spraying system. A heat transfer unit is positioned forward of and is operably coupled to the battery system for thermally conditioning the battery system.

20 Claims, 22 Drawing Sheets

(51) Int. Cl.

| | |
|---|---|
| ***B60K 11/04*** | (2006.01) |
| ***B60L 1/00*** | (2006.01) |
| ***B60L 50/60*** | (2019.01) |
| ***B60L 58/24*** | (2019.01) |

(56) References Cited

U.S. PATENT DOCUMENTS

| | | | |
|---|---|---|---|
| 9,908,407 | B1 | 3/2018 | Bennett et al. |
| 10,099,552 | B2 | 10/2018 | Long et al. |
| 10,145,369 | B2 | 12/2018 | Häfele et al. |
| 10,543,733 | B2 | 1/2020 | Eckelberg et al. |
| 11,214,240 | B2 | 1/2022 | Kim et al. |
| 11,677,293 | B2 | 6/2023 | Lilley |
| 11,685,268 | B2 | 6/2023 | Sjöholm |
| 11,745,573 | B2 | 9/2023 | Caliskan et al. |
| 11,787,275 | B2 | 10/2023 | Watt et al. |
| 11,894,533 | B2 | 2/2024 | Menon et al. |
| 12,084,204 | B2 | 9/2024 | Walsh |
| 2022/0105815 | A1 | 4/2022 | Björkman et al. |
| 2022/0134843 | A1 | 5/2022 | Andreuccetti et al. |
| 2022/0144059 | A1 | 5/2022 | An et al. |
| 2023/0132970 | A1 | 5/2023 | Hashimoto et al. |
| 2023/0373288 | A1 | 11/2023 | Caliskan et al. |

FOREIGN PATENT DOCUMENTS

| | | | | | |
|---|---|---|---|---|---|
| CN | 214001299 | | | 8/2021 | |
| CN | 214775341 | | | 11/2021 | |
| CN | 215119008 | | | 12/2021 | |
| CN | 115571367 | A | * | 1/2023 | ................ B64F 5/23 |
| CN | 218431800 | U | * | 2/2023 | |
| EP | 2335988 | A1 | | 6/2011 | |
| WO | 2022131085 | A1 | | 6/2022 | |
| WO | WO-2022252407 | A1 | * | 12/2022 | ................ B60P 3/00 |
| WO | 2023031848 | A1 | | 3/2023 | |
| WO | 2023119929 | A1 | | 6/2023 | |
| WO | 2023190025 | A1 | | 10/2023 | |

OTHER PUBLICATIONS

CN-115571367-A Translation (Year: 2023).*

CN-218431800-U Translation (Year: 2023).*

ISRWO for PCT/IB2025/000113, International Searching Authority, EPO, Jul. 1, 2025.

E-Mini My Lite; Electric Small Deicing Unit; Vestergaard Company; Oct. 20, 2022.

Rebecca Kanable; How Electric Deicers Contribute to Ground Handling Sustainability; Aviation Pros; Sep. 6, 2023.

The Elephant® e-BETA; Vestergaard Company; Unknown Date.

* cited by examiner

ELECTRICALLY OPERATED AIRCRAFT DEICING VEHICLES

CROSS-REFERENCE TO RELATED APPLICATIONS

The present application claims the benefit of U.S. Provisional Application No. 63/566,323, filed Mar. 17, 2024 and U.S. Provisional Application No. 63/694,610, filed Sep. 13, 2024 the entire contents of each are hereby incorporated by reference.

TECHNICAL FIELD OF THE DISCLOSURE

The present disclosure relates, in general, to aircraft deicing vehicles and, in particular, to electrically operated aircraft deicing vehicles that are equipped with a rechargeable battery system that provides power for movement of the vehicle, positioning a fluid spraying system, heating an operator cabin and controlling deicing operations.

BACKGROUND

Aircraft deicing is a critical airport ground support operation that enhances flight safety during winter weather conditions including ice and snow. Ice buildup on aircraft surfaces, such as the wings and tail, can disrupt airflow and compromise aerodynamics, leading to reduced lift and control issues. Aircraft deicing removes ice and snow from such aircraft surfaces and prevents further accumulation of ice and snow on such aircraft surfaces, which not only restores aircraft performance and aerodynamic integrity but also safeguards against ice-related phenomena like stalls and loss of control. In addition, aircraft deicing enhances airport operational efficiency by minimizing delays and cancellations associated with winter weather conditions. In general, aircraft deicing plays an indispensable role in aviation safety by ensuring that flights can proceed smoothly and securely even during wintry weather.

Deicing operations are commonly performed using diesel powered deicing trucks that drive from an airport hangar to and between aircraft requiring deicing. The deicing trucks transport heated deicing and anti-icing fluids in large tanks. The deicing trucks are equipped with booms and nozzles that spray deicing fluid onto the aircraft surfaces to remove ice and snow. In addition, the deicing trucks may spray anti-icing fluid onto the aircraft surfaces to prevent further accumulation of ice and snow. The deicing trucks are operated by trained personnel who follow strict procedures to ensure thorough and effective aircraft deicing. It has been found, however, that diesel powered deicing trucks create air and noise pollution including emitting nitrogen oxides, particulate matter and greenhouse gases such as carbon dioxide into the atmosphere during operations. Accordingly, a need has arisen for aircraft deicing vehicles that are capable of performing the required deicing functions without producing the undesirable air and noise pollution.

SUMMARY

In one aspect, the present disclosure is directed to an electrically operated aircraft deicing vehicle. The deicing vehicle has a chassis that includes first and second longitudinally extending beams. Front and rear axles are coupled to the chassis. A positioning system is coupled to the chassis. A fluid spraying system is coupled to the positioning system. A fluid tank system is coupled to the chassis. The fluid tank system is in fluid communication with the fluid spraying system. A rechargeable battery system is coupled to the chassis. The battery system includes one or more battery modules and a charging unit. An electric drive motor is operably coupled to the battery system. The electric drive motor is positioned aft of the front axle and between the first and second longitudinally extending beams. The electric drive motor is operably coupled to the front axle to rotate one or more front wheels. A hydraulic pump system is operably coupled to the battery system. The hydraulic pump system is operably coupled to the positioning system to maneuver the fluid spraying system. A heat transfer unit is coupled to the chassis. The heat transfer unit is positioned forward of the one or more battery modules and is configured to thermally condition the one or more battery modules.

In certain embodiments, at least a portion of the battery system may be positioned forward of and above the front axle. In some embodiments, a mounting assembly for the electric drive motor may include a first bracket coupled to the first longitudinally extending beam and a second bracket coupled to the second longitudinally extending beam. In certain embodiments, the electric drive motor may be positioned below the battery system. In some embodiments, the electric drive motor may have an axis of rotation that is positioned along a longitudinal centerline of the deicing vehicle. In certain embodiments, a mounting assembly for the hydraulic pump system may be coupled to the first longitudinally extending beam. In some embodiments, the hydraulic pump system may be positioned outboard of the first longitudinally extending beam, between the front and rear axles and lateral of the electric drive motor. In certain embodiments, the hydraulic pump system may include one or more hydraulic pumps each having an electric motor operably coupled to the battery system. In some embodiments, the heat transfer unit may be configured to heat the one or more battery modules during operating cycles and cool the one or more battery modules during charging cycles. In certain embodiments, the charging unit may be positioned below the heat transfer unit.

In some embodiments, the positioning system may include a rotatable tower coupled to the chassis, a telescoping boom coupled to the tower, an operator cabin coupled to the telescoping boom and a telescoping arm coupled to the operator cabin. In certain embodiments, the positioning system may include a turret coupled to the telescoping boom with the operator cabin mounted on the turret. In some embodiments, a heating system may be at least partially disposed within the operator cabin and operably coupled to the battery system. In certain embodiments, the fluid tank system may include a plurality of fluid tanks such as at least one deicing fluid tank and at least one anti-icing fluid tank. In some embodiments, a fluid pump system may be configured to provide fluid from the fluid tank system to the fluid spraying system. In certain embodiments, the fluid pump system may include one or more fluid pumps each having a hydraulic motor operably coupled to the hydraulic pump system. In some embodiments, a radiator may be positioned forward of and in fluid communication with the heat transfer unit. In certain embodiments, an air compressor may be positioned forward of the front axle and may include an electric motor operably coupled to the battery system. In some embodiments, a power distribution unit may be positioned lateral of and operably coupled to the battery system.

In certain embodiments, a DC-to-DC converter system may be positioned between the air compressor and the power distribution unit. In some embodiments, a vehicle control unit may be positioned lateral of the battery system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 7A-7F are various views of an electrical system subassembly for an electrically operated aircraft deicing vehicle in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1:
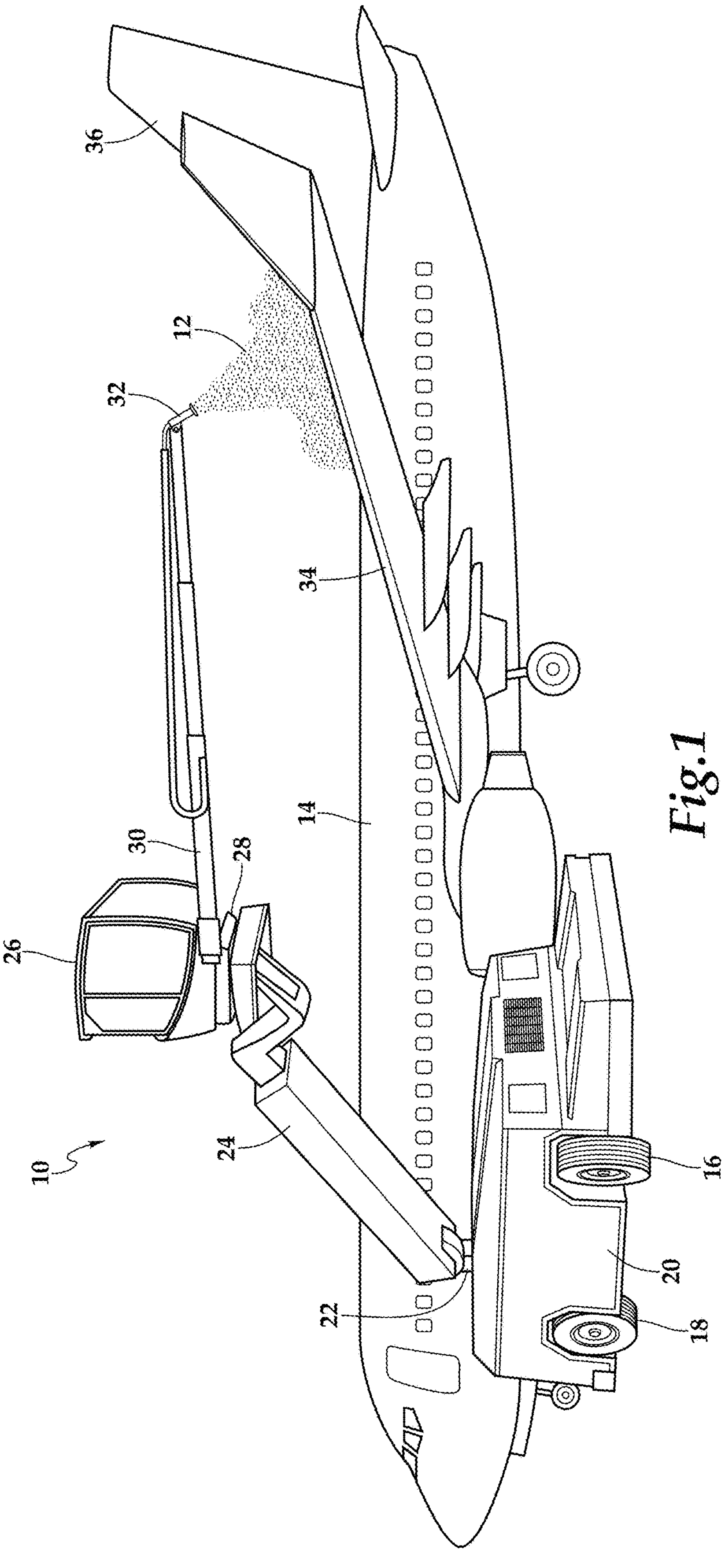
FIG. 1 is a schematic illustration of an electrically operated aircraft deicing vehicle engaging in a deicing operation of an aircraft in accordance with embodiments of the present disclosure.

Referring to FIG. 1 in the drawings, a ground support vehicle depicted as an electrically operated aircraft deicing vehicle is schematically illustrated and generally designated 10. In the illustrated embodiment, deicing vehicle 10 is spraying deicing fluid or anti-icing fluid, which will be referred to herein as deicing fluid 12, on a wing of an airplane 14. Deicing vehicle 10 is a wheeled vehicle that includes a pair of front wheels 16 and a pair of rear wheels 18. In the illustrated embodiment, front wheels 16 are the drive wheels for deicing vehicle 10 as well as the steering control wheels for deicing vehicle 10 such that front wheels 16 control the direction of travel of deicing vehicle 10 when deicing vehicle 10 is moving. Deicing vehicle 10 includes a vehicle body 20 that is supported by a chassis. A hydraulically controlled positioning system of deicing vehicle 10 includes a tower 22 that is located proximate the aft end of deicing vehicle 10 and is rotatable relative to body 20, a telescoping boom assembly 24 that is configured to pivot in a vertical direction relative to tower 22, an operator cabin 26 that is positioned at a distal end of telescoping boom assembly 24 and is mounted on a turret 28 such that operator cabin 26 may rotate relative to telescoping boom assembly 24, and a telescoping arm 30 that supports a fluid spraying system 32 depicted as including one or more spray nozzles for discharging deicing fluid 12 onto aircraft surfaces, such as wing 34 and tail 36, to remove ice and snow and/or prevent the accumulation of ice and snow thereon.

Referring now to FIGS. 2A-2D of the drawings, additional details relating to deicing vehicle 10 will be disclosed. Deicing vehicle 10 is a fully self-contained deicing vehicle that has a tank system 40 including multiple fluid tanks, such as fluid tanks 40*a*, 40*b*, 40*c*, that are used to contain, heat and transport deicing fluid 12 from an airport hangar to and between aircraft requiring deicing. Fluid tanks 40*a*, 40*b*, 40*c* may contain the same or different fluids therein such as one or more mixtures of deicing fluid and anti-icing fluid. Deicing vehicle 10 includes an electrically operated heating system 42 that is in fluid communication with one or more heat exchangers positioned inside one or more of fluid tanks 40*a*, 40*b*, 40*c* to maintain deicing fluid 12 at the desired temperature. Deicing fluid 12 is supplied from tank system 40 to fluid spraying system 32 at a high pressure via a piping system 44, a fluid pump system 46 including a plurality of fluid pumps each having a hydraulic motor and a tubing system (not visible) disposed within telescoping boom assembly 24. Deicing vehicle 10 has a hydraulic system that includes a hydraulic fluid tank 48, a hydraulic pump system 50 including a plurality of electrically operated hydraulic pumps and a variety of hydraulically operated components such as the fluid pumps and the vehicle braking system that are in fluid communication with hydraulic fluid tank 48 and/or a hydraulic pump system 50 via a network of hydraulic lines. In addition, pressurized hydraulic fluid is used by the positioning system to rotate tower 22, raise, lower, extend and retract boom assembly 24, rotate operator cabin 26 and raise, lower, extend and retract arm 30.

Deicing operations are commonly performed using diesel powered aircraft deicing vehicles that include one or more diesel engines that provide the power for movement of the vehicle, operating the hydraulic system, heating fluids stored in the tank system, heating the operator cabin and generating electricity. It has been found, however, that diesel powered aircraft deicing vehicles create air and noise pollution including emitting nitrogen oxides, particulate matter and greenhouse gases such as carbon dioxide into the atmosphere during operations. The present embodiments, however, are capable of performing the required deicing functions without producing the undesirable air and noise pollution by utilizing a rechargeable battery system to enable a fully electrically operated aircraft deicing vehicle. In the illustrated embodiment, rechargeable battery system 52 provides the energy necessary to power the movement of deicing vehicle 10. Specifically, deicing vehicle 10 has a drivetrain 54 depicted as including an electric drive motor 56 that receives electrical energy from battery system 52, a driveshaft 58 and a front axle (see also FIG. 4B) that is operably coupled to front wheels 16 such that torque and rotational energy is delivered from battery system 52 to front wheels 16. In addition, battery system 52 provides power to operate hydraulic pump system 50, heating system 42, a heating system 62 of operator cabin 26 (see also FIG. 3) as well as the various control systems used to operate deicing vehicle 10 including touchscreen monitor 64 in operator cabin 26. Battery system 52 is charged via a charging port 66 positioned behind an access panel 68 of deicing vehicle 10. Charging port 66 may be a combined charging system (CCS) that enables fast charging via a level 3 direct current input or slower charging via a level 1 or level 2 alternating current input. For DC fast charging of battery system 52, charging port 66 may be coupled directly to battery system 52. For AC charging of battery system 52, charging port 66 may be coupled to battery system 52 via an onboard charging unit and power distribution system as discussed herein.

Figure 3:
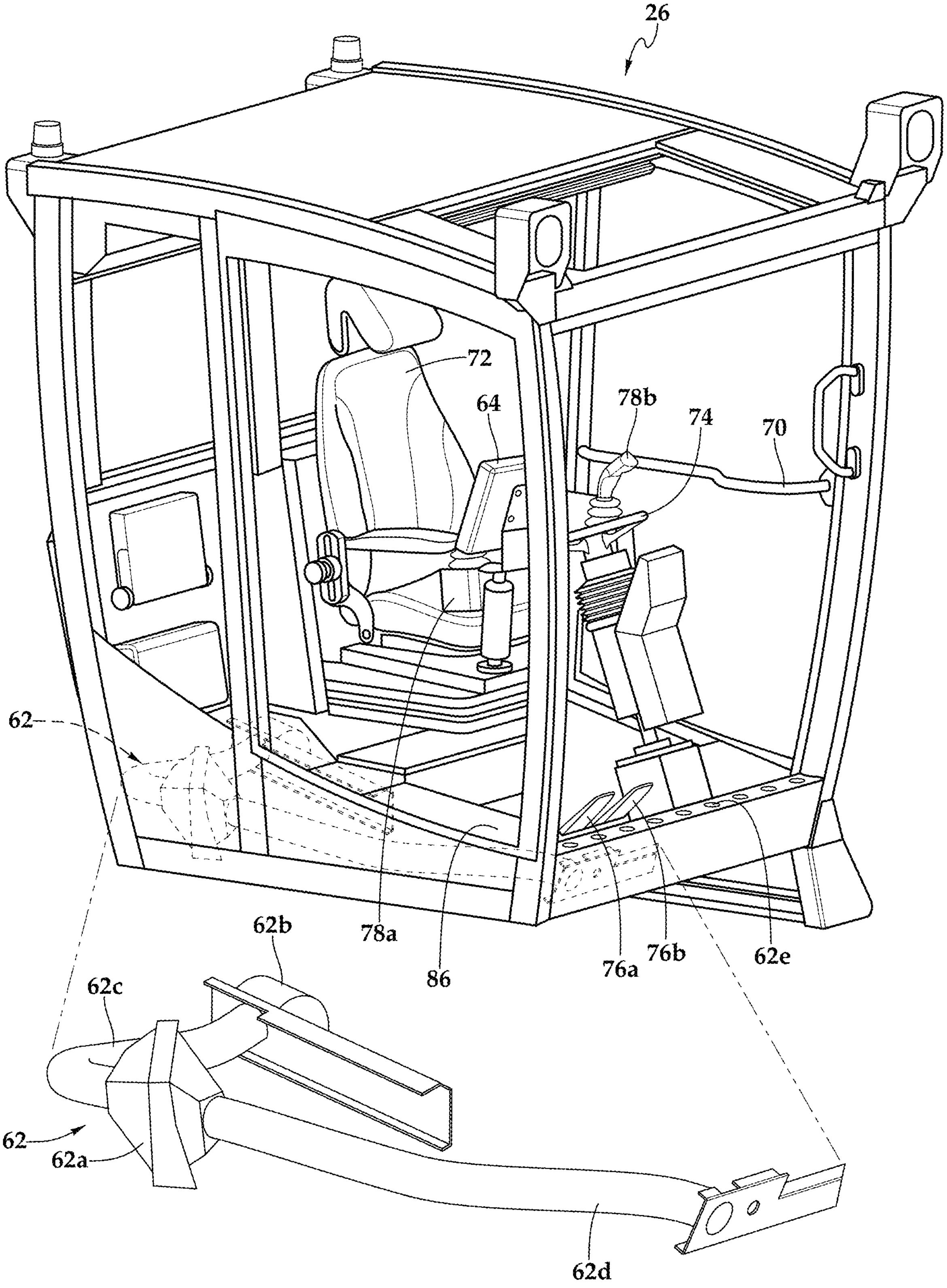
FIG. 3 is an isometric view of an operator cabin for an electrically operated aircraft deicing vehicle in accordance with embodiments of the present disclosure.

Referring additionally to FIG. 3 of the drawings, deicing vehicle 10 is configured to be controlled by a single operator from operator cabin 26. In the illustrated embodiment, operator cabin 26 is a fully enclosed space providing a comfortable environment for operating deicing vehicle 10. Operator cabin 26 includes a door 70 to enable ingress to and egress from operator cabin 26. Operator cabin 26 includes an operator seat 72 from which the operator controls deicing vehicle 10 in both a driving mode of deicing vehicle 10 when cabin 26 is positioned on body 20 and a spraying mode of deicing vehicle 10 when cabin 26 is raised above body 20 by telescoping boom assembly 24. It should be understood by those having ordinary skill in the art that when deicing vehicle 10 is in the spraying mode, the operator remains able to drive deicing vehicle 10 around an aircraft being deiced. Operator cabin 26 has vehicle controls including a steering controller 74 that is operably coupled to front wheels 16 and motion controllers 76*a*, 76*b*, depicted as pedals, for accelerating and stopping deicing vehicle 10. Operator cabin 26 also has deicing controllers 78*a*, 78*b*, depicted as joysticks, for controlling the operations and positioning of fluid spraying system 32. Operator cabin 26 includes touchscreen monitor 64 that displays operating information and provides an interface for controlling various deicing vehicle functionality. Heating system 62 is positioned within operator cabin 26 beneath one or more floor panels 86. Heating system 62 is configured to heat operator cabin 26. In the illustrated embodiment, heating system 62 includes an electrical resistance heater 62*a* including, for example, as a positive-temperature-coefficient (PTC) heating element and an adjustable-speed direct current blower 62*b*, each of which is operably coupled to and powered by battery system 52. Blower 62*b* and heater 62*a* are coupled together with ducting 62*c*. The heated air from heater 62*a* is circulated into operator cabin 26 via ducting 62*d* and a venting system 62*e*.

Figure 2A:
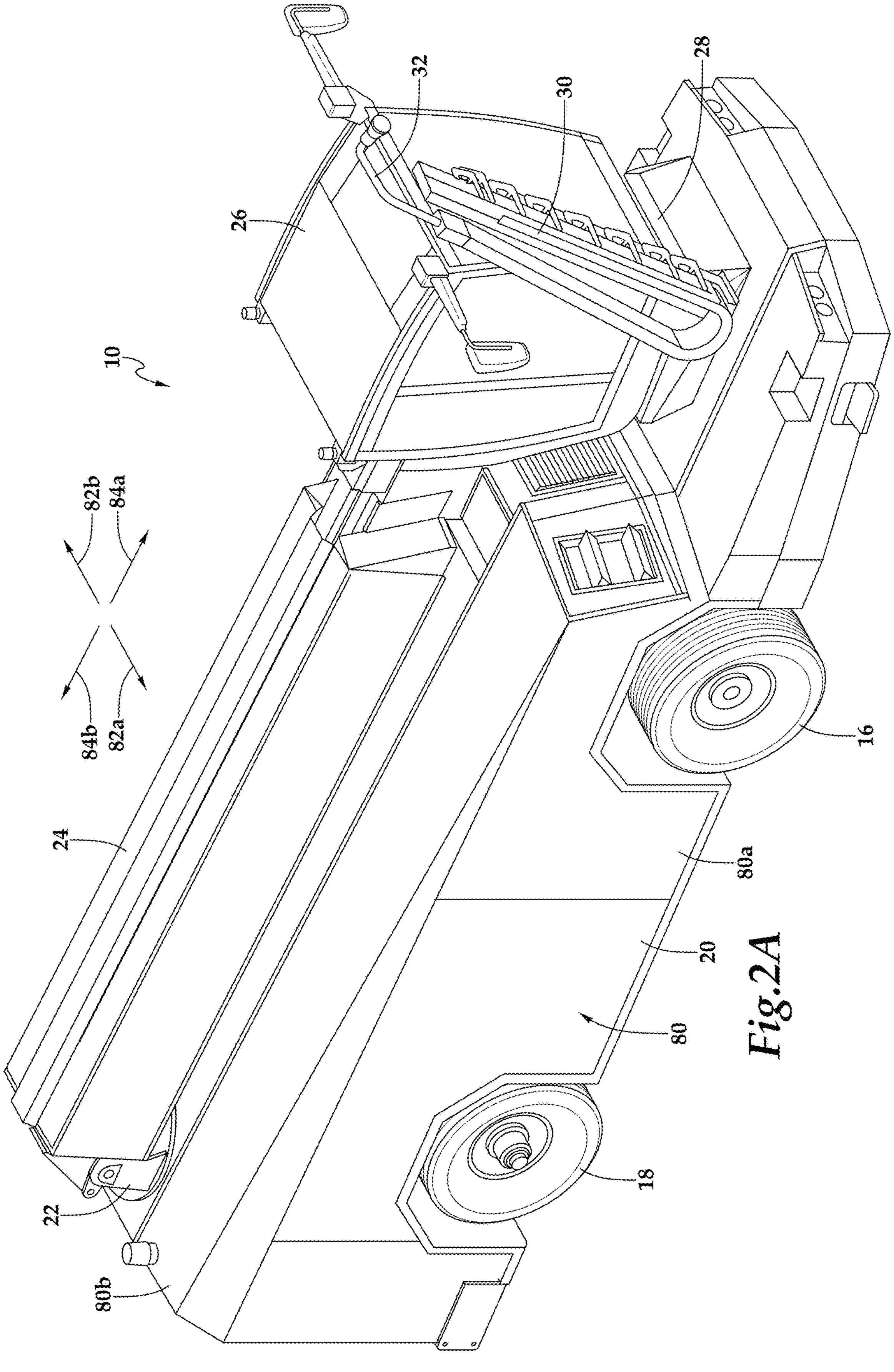
FIGS. 2A-2D are isometric and side views of an electrically operated aircraft deicing vehicle in accordance with embodiments of the present disclosure.
Figure 2B:
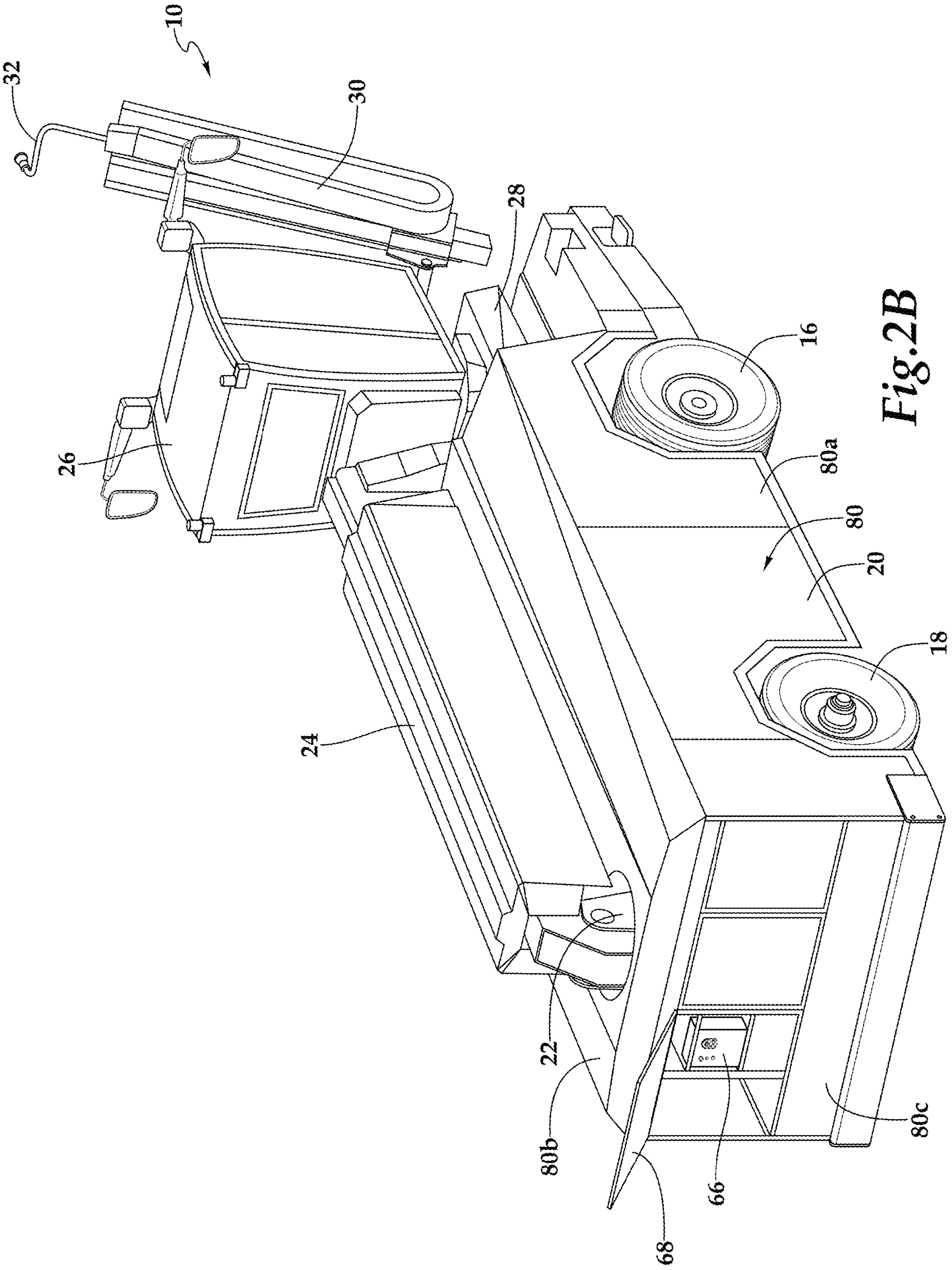
Figure 2C:
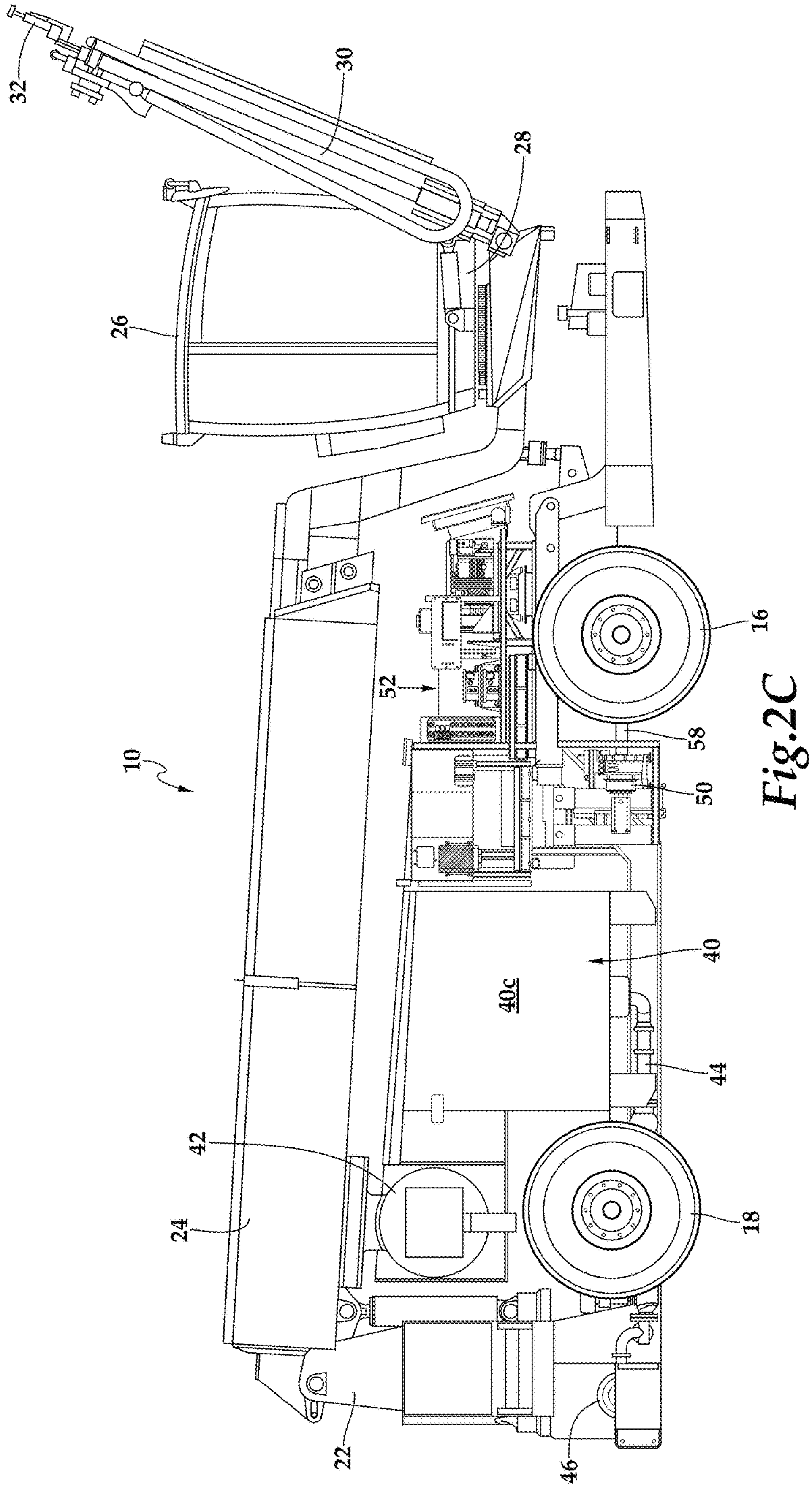
Figure 2D:
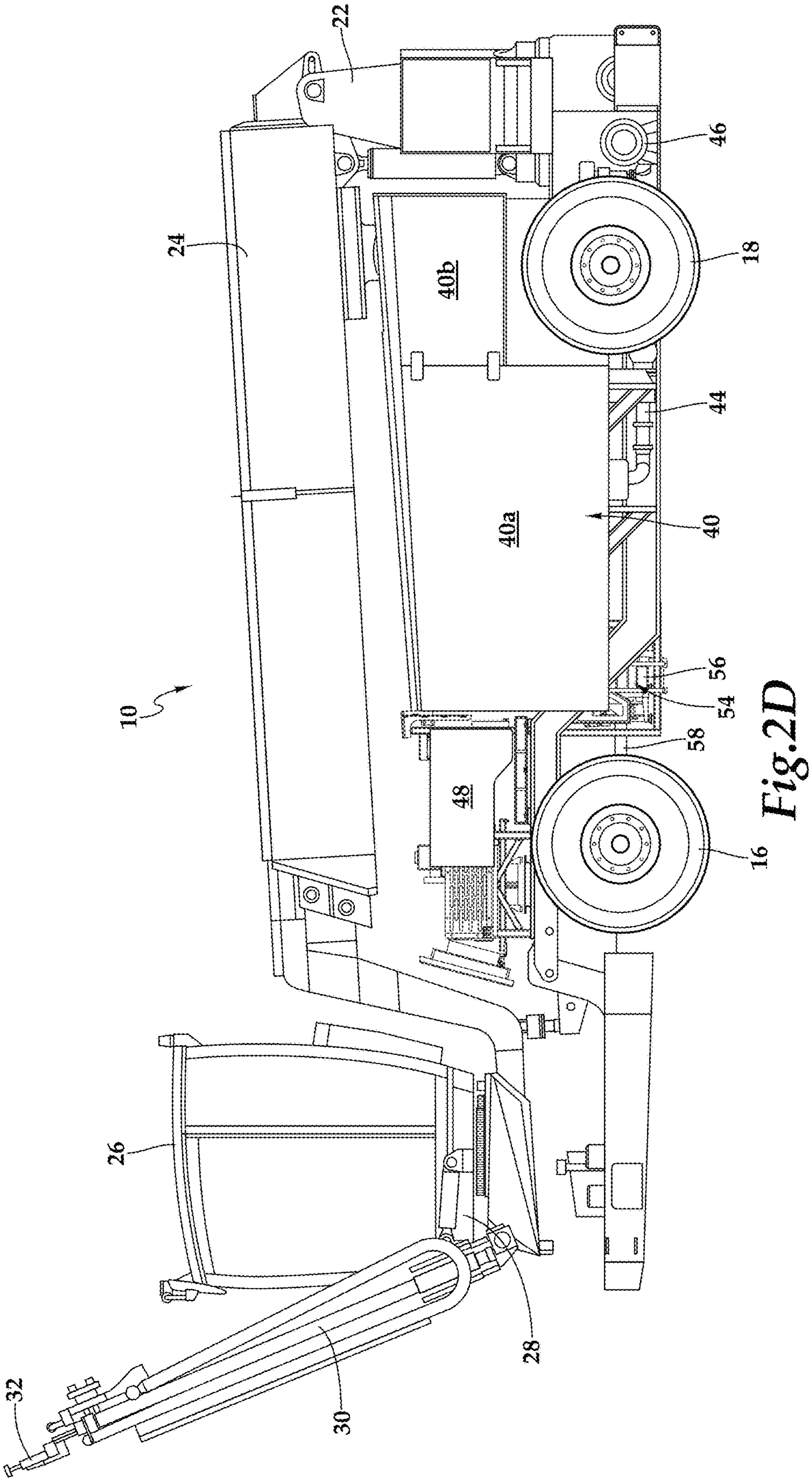

Deicing vehicle 10 includes various body panels 80 that are visible in FIG. 2A but have been removed in FIGS. 2B-2C to reveal the internal components of deicing vehicle 10. For example, deicing vehicle 10 includes one or more right side body panels 80*a*, one or more roof body panels 80*b*, one or more left side body panels (not visible) and one or more aft body panels (not visible). It should be understood by those having ordinary skill in the art that the right side and the left side of deicing vehicle 10 will be with reference to the operator of deicing vehicle 10 when operator cabin 26 is in the driving configuration depicted in FIGS. 2A-2C with the right side of deicing vehicle 10 corresponding to the right side of the operator and the left side of deicing vehicle 10 corresponding to the left side of the operator. As best seen in FIG. 2A, the rightward direction is indicated by rightward arrow 82*a* and the leftward direction is indicated by leftward arrow 82*b*. The rightward and leftward directions also represent the lateral direction of deicing vehicle 10 with the forward and backward directions being normal thereto and represented by forward arrow 84*a* and backward arrow 84*b*. The forward and backward directions also represent the longitudinal direction of deicing vehicle 10. The backward direction may also be referred to herein as the aftward direction. Body panels 80 provide an outer skin for deicing vehicle 10 and protect the various operating components of deicing vehicle 10 disposed therein. Body panels 80 are preferably comprised of metal or metal alloy, such as aluminum. Body panels 80 may include one or more access panels (not shown) to enable access to the various operating components positioned behind body panels 80.

Figure 4A:
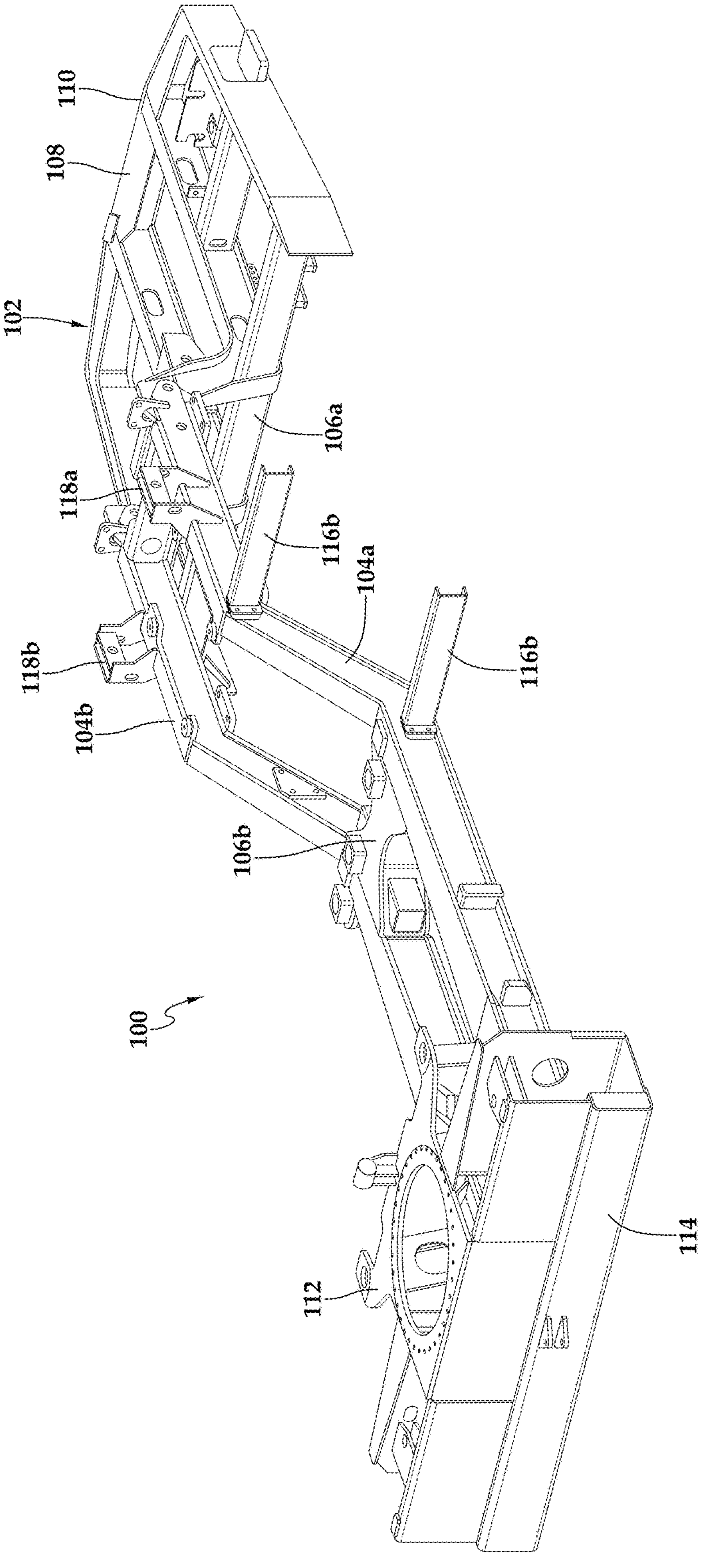
FIGS. 4A-4F are isometric views of an electrically operated aircraft deicing vehicle in various states of assembly in accordance with embodiments of the present disclosure.

Referring now to FIGS. 4A-4F of the drawings, an electrically operated aircraft deicing vehicle 100 in various states of assembly will now be described. It should be understood by those having ordinary skill in the art that deicing vehicle 100 is representative of deicing vehicle 10 discussed herein. As best seen in FIG. 4A, structural support for deicing vehicle 100 is provided by a chassis 102, on or around which the various components of deicing vehicle 100 are assembled. Chassis 102 is formed of a plurality of structural frame members that are preferably welded together. The structural frame members include a right longitudinally extending beam 104*a* and a left longitudinally extending beam 104*b* with brace members extending therebetween such as cross member 106*a* and cross channel 106*b*. A cabin platform frame 108 that includes a front bumper 110 forms the forward end of chassis 102. A tower mount frame 112 that includes a rear bumper 114 forms the aft end of chassis 102. Chassis 102 also includes upper and lower mounting rails 116*a*, 116*b* that extend laterally outboard from right longitudinally extending beam 104*a* as well as a plurality of mounting brackets, such as mounting brackets 118*a*, 118*b*. Chassis 102 is comprised of metal or metal alloy, such as steel. In this state, chassis 102 may be referred to as a common chassis as chassis 102 may be used as the foundation for multiple different deicing vehicles including electrically operated aircraft deicing vehicle 100 as well as certain diesel powered aircraft deicing vehicles.

Figure 4B:
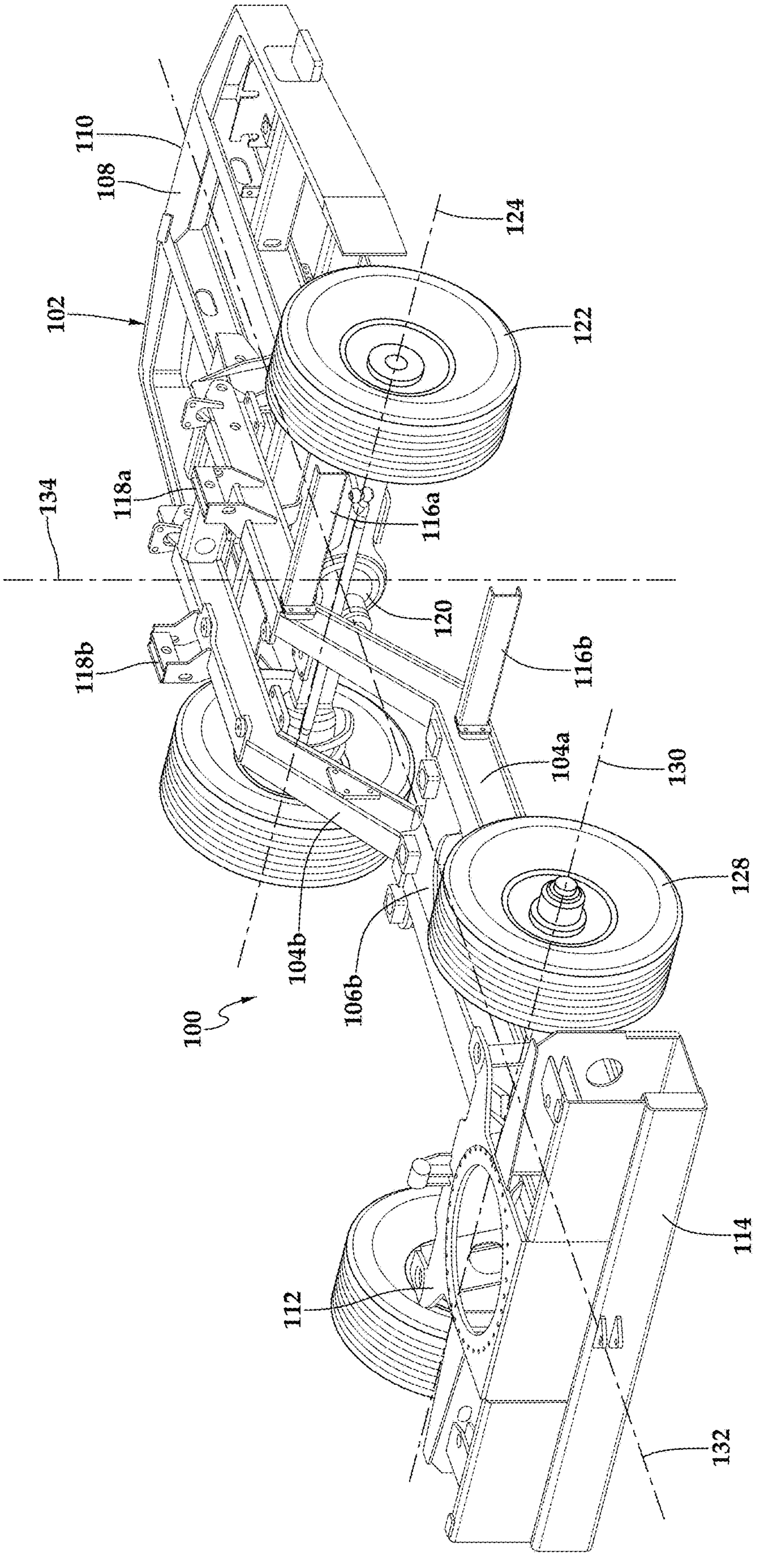

As best seen in FIG. 4B, a front axle 120 is coupled to chassis 102 via a front suspension (not shown). Front wheels 122 are coupled to front axle 120 and are configured to rotate about a front axle axis of rotation 124. In addition, a rear axle 126 (see also FIG. 4F) is coupled to chassis 102. Rear wheels 128 are coupled to rear axle 126 and are configured to rotate about a rear axle axis of rotation 130. When front wheels 122 and rear wheels 128 are coupled thereto, chassis 102 may be referred to as a wheeled chassis. Deicing vehicle 100 has a longitudinal centerline 132 that extends substantially parallel to and between longitudinally extending beams 104*a*, 104*b* and through the center of front axle 120. Deicing vehicle 100 has a vertical axis 134 that intersects longitudinal centerline 132 and axis of rotation 124.

Figure 4C:
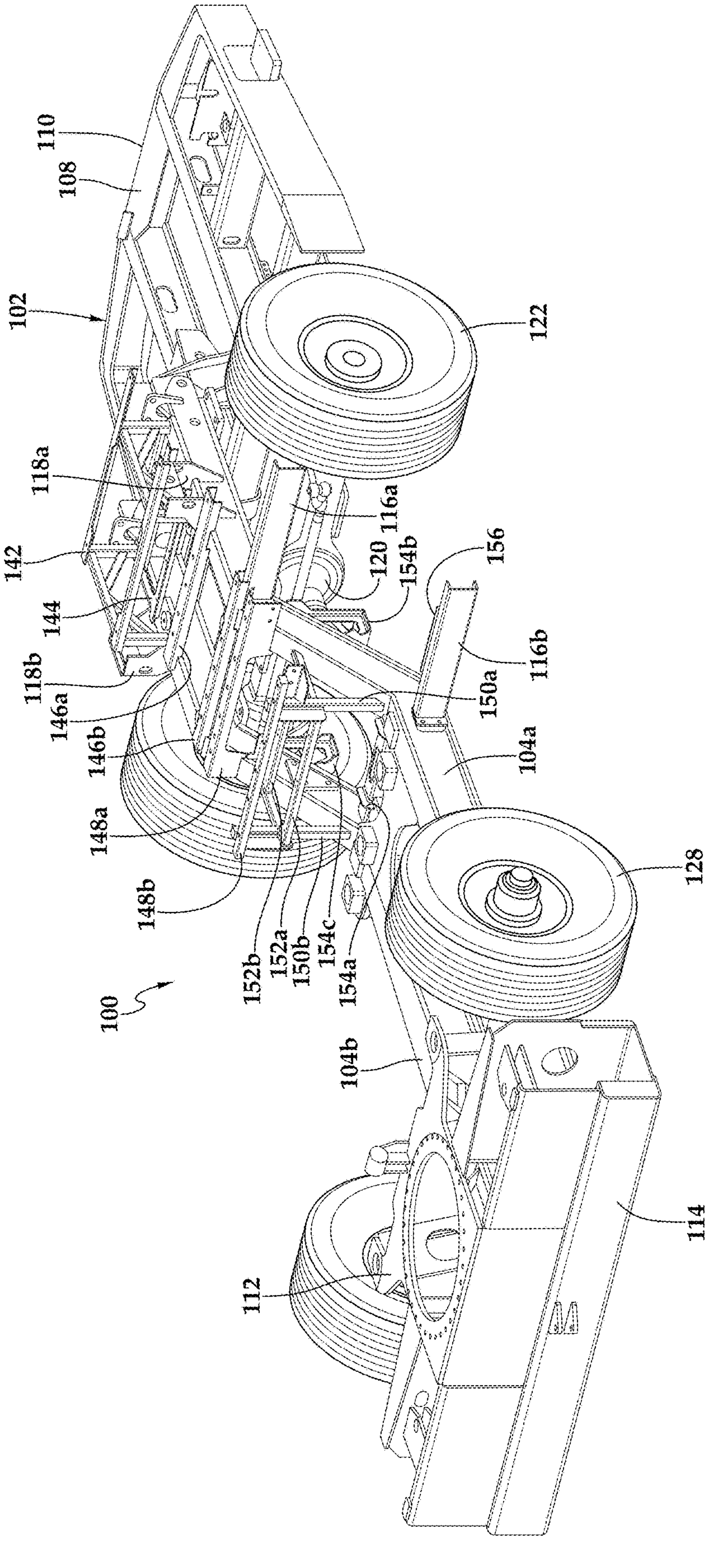
Figure 5:
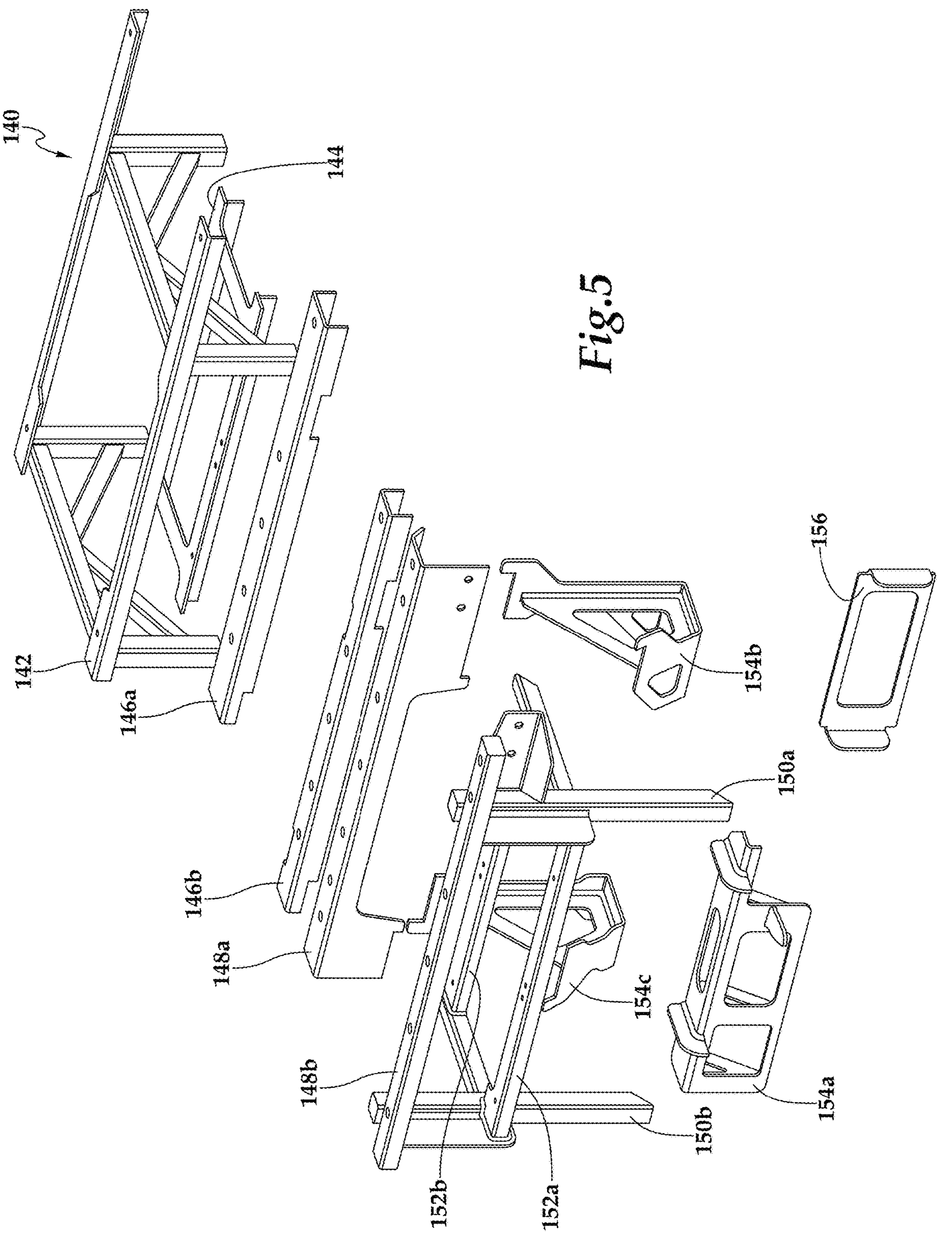
FIG. 5 is an isometric view of weld-on frame members that are added to a common chassis for an electrically operated aircraft deicing vehicle in accordance with embodiments of the present disclosure.

As best seen in FIG. 4C, the common chassis of FIGS. 4A-4B is modified with additional frame members in order to form the welded chassis assembly for deicing vehicle 100. To make this modification, additional weld-on frame members 140 are added to chassis 102 (see also FIG. 5). In the illustrated embodiment, the weld-on frame members 140 include heat transfer unit frame member 142 that is welded to longitudinally extending beams 104*a*, 104*b* above front axle 120; charging unit frame member 144 that is welded to longitudinally extending beams 104*a*, 104*b* above front axle 120; forward battery module frame members 146*a*, 146*b* that are welded to longitudinally extending beams 104*a*, 104*b* above front axle 120; aft battery module frame members 148*a*, 148*b* that are welded to longitudinally extending beams 104*a*, 104*b* above front axle 120 with aft battery module frame member 148*b* welded to longitudinally extending beams 104*a*, 104*b* via right brace assembly 150*a* and left brace assembly 150*b*; electric drive motor inverters frame members 152*a*, 152*b* that are welded to right brace assembly 150*a* and left brace assembly 150*b* aft of front axle 120; electric drive motor frame members 154*a*, 154*b*, 154*c* that are welded to longitudinally extending beams 104*a*, 104*b* forward of front axle 120; and hydraulic pump system frame member 156 that is welded to mounting rail 116*b*. In this manner, the common chassis is modified with additional frame members to form chassis 102 for deicing vehicle 100.

Figure 4D:
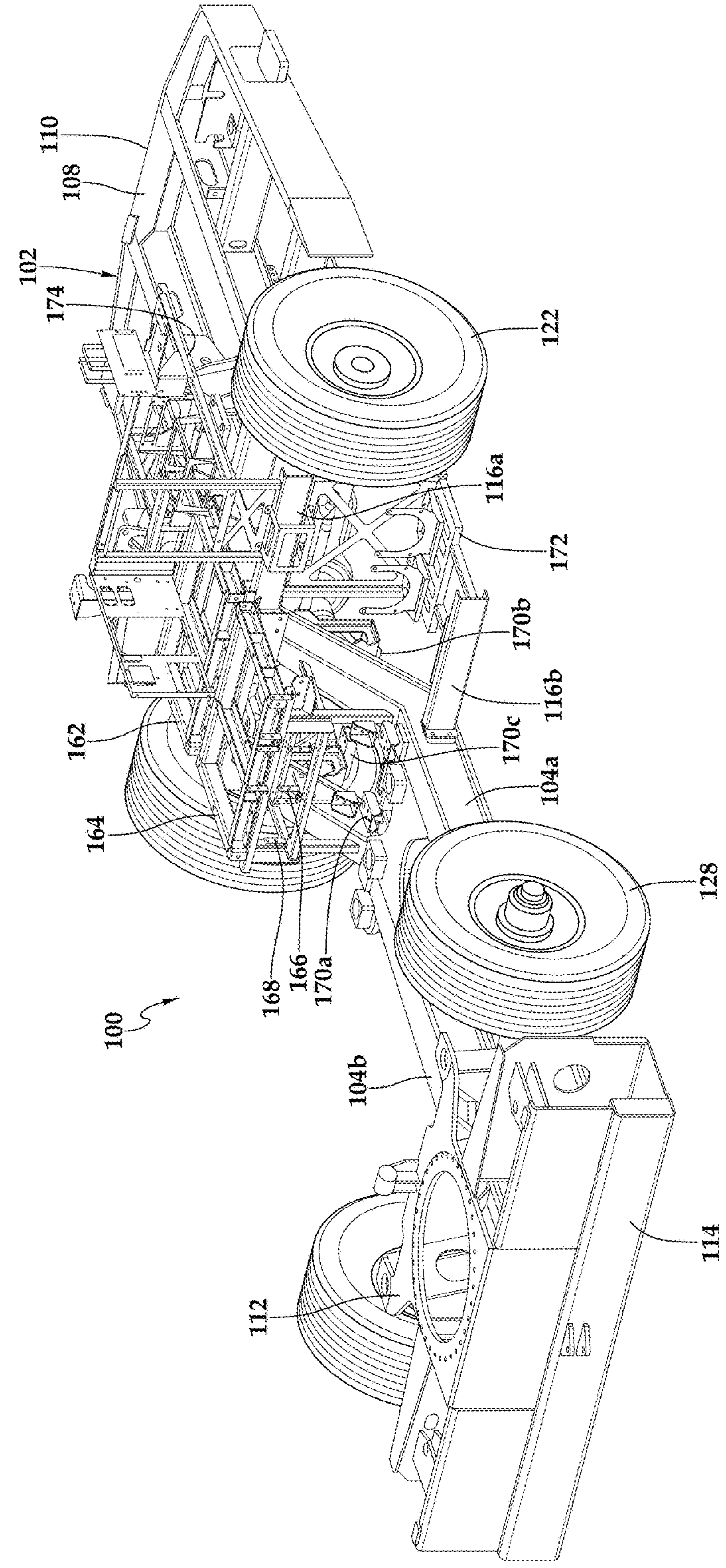
Figure 6:
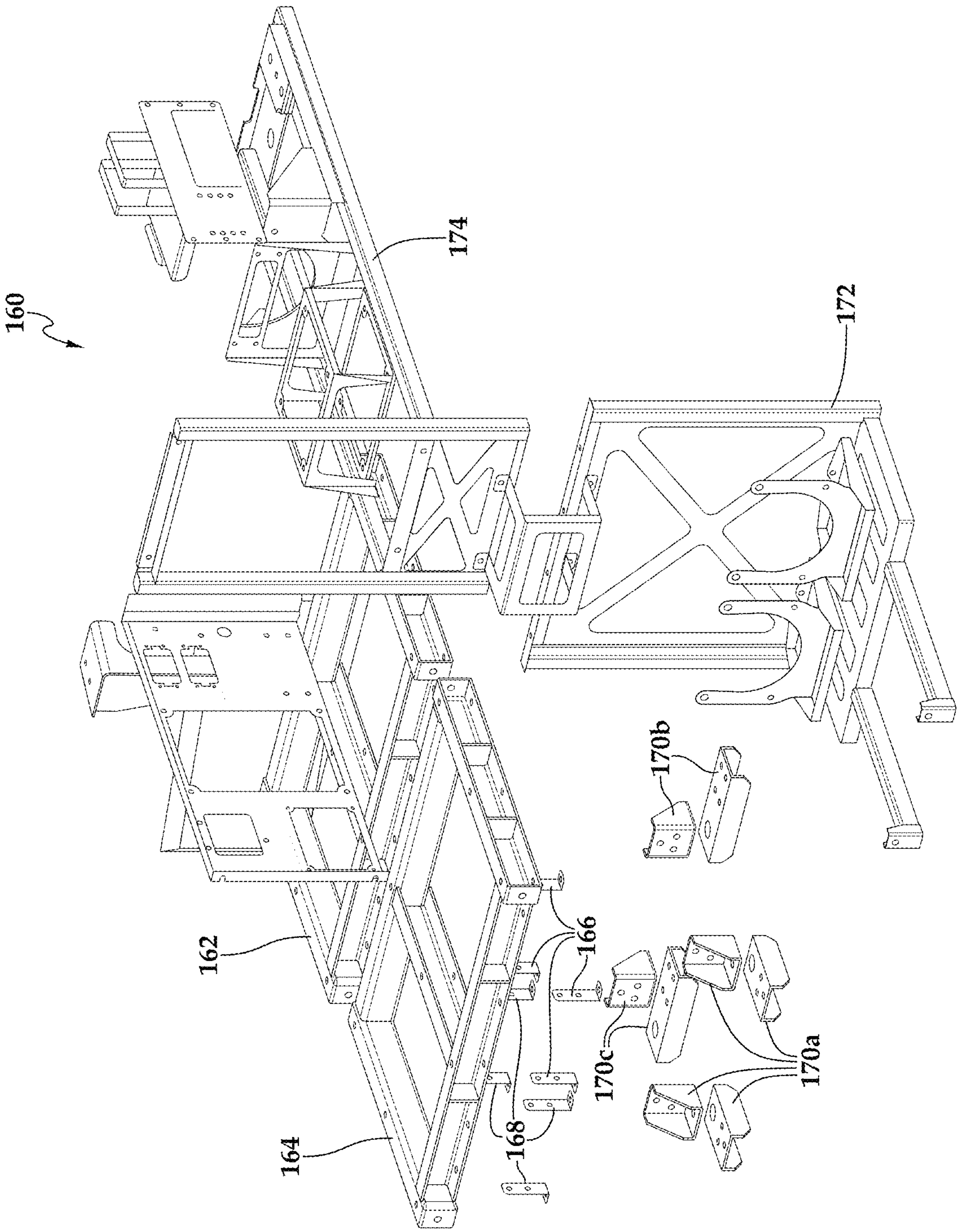
FIG. 6 is an isometric view of bolt-on frame members that are added to a modified chassis for an electrically operated aircraft deicing vehicle in accordance with embodiments of the present disclosure.
Figure 7A:
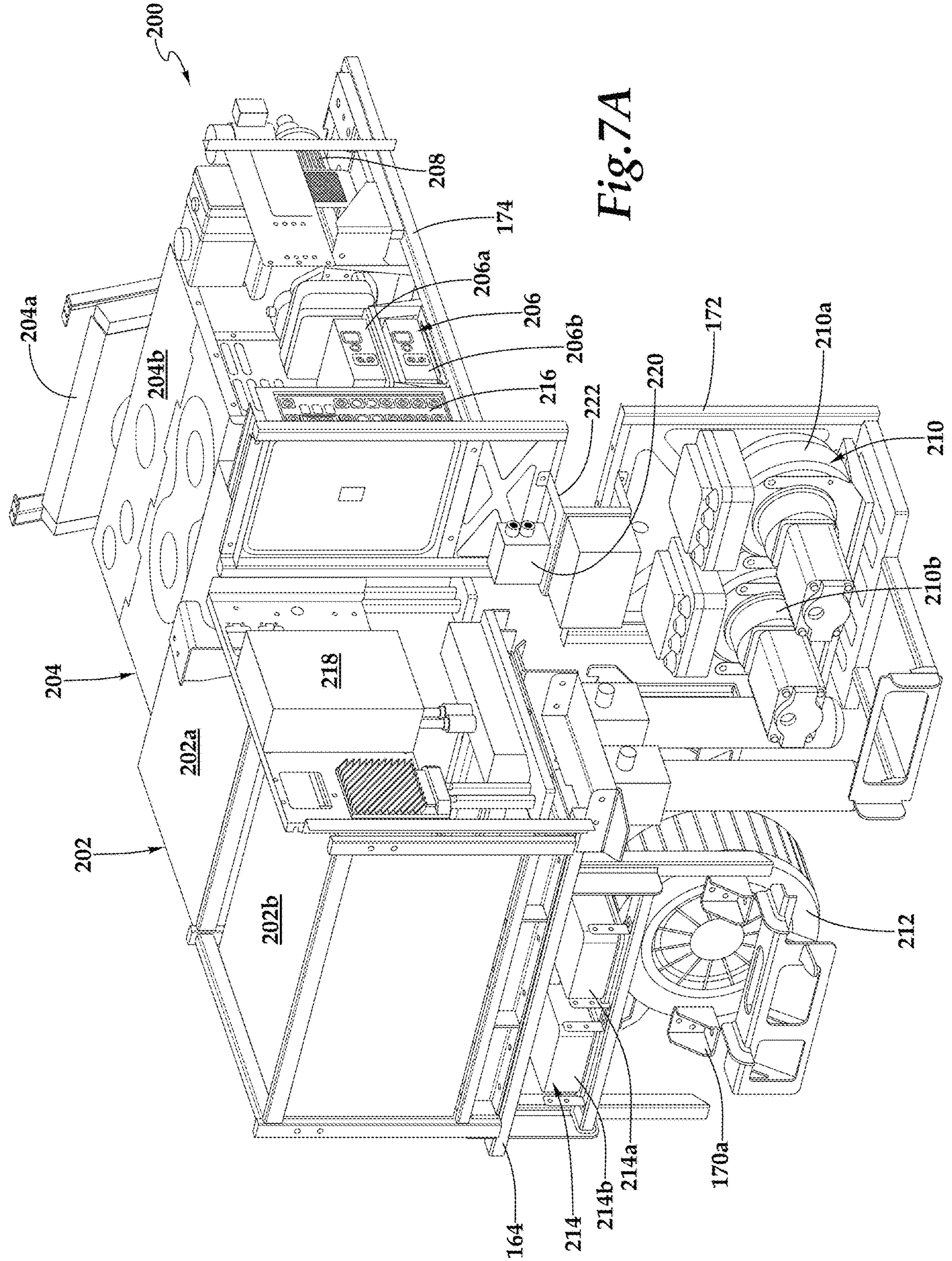
Figure 7B:
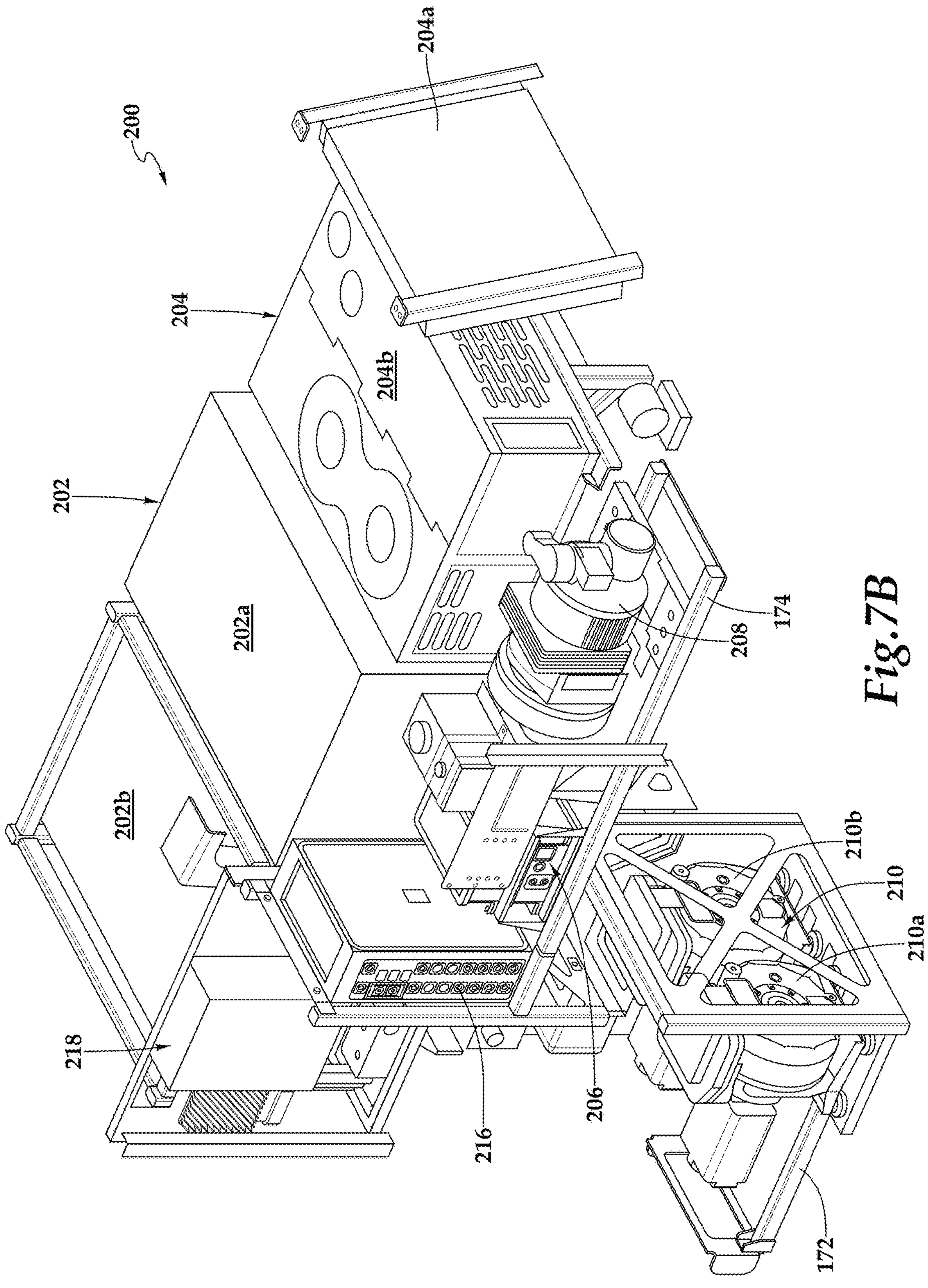
Figure 7C:
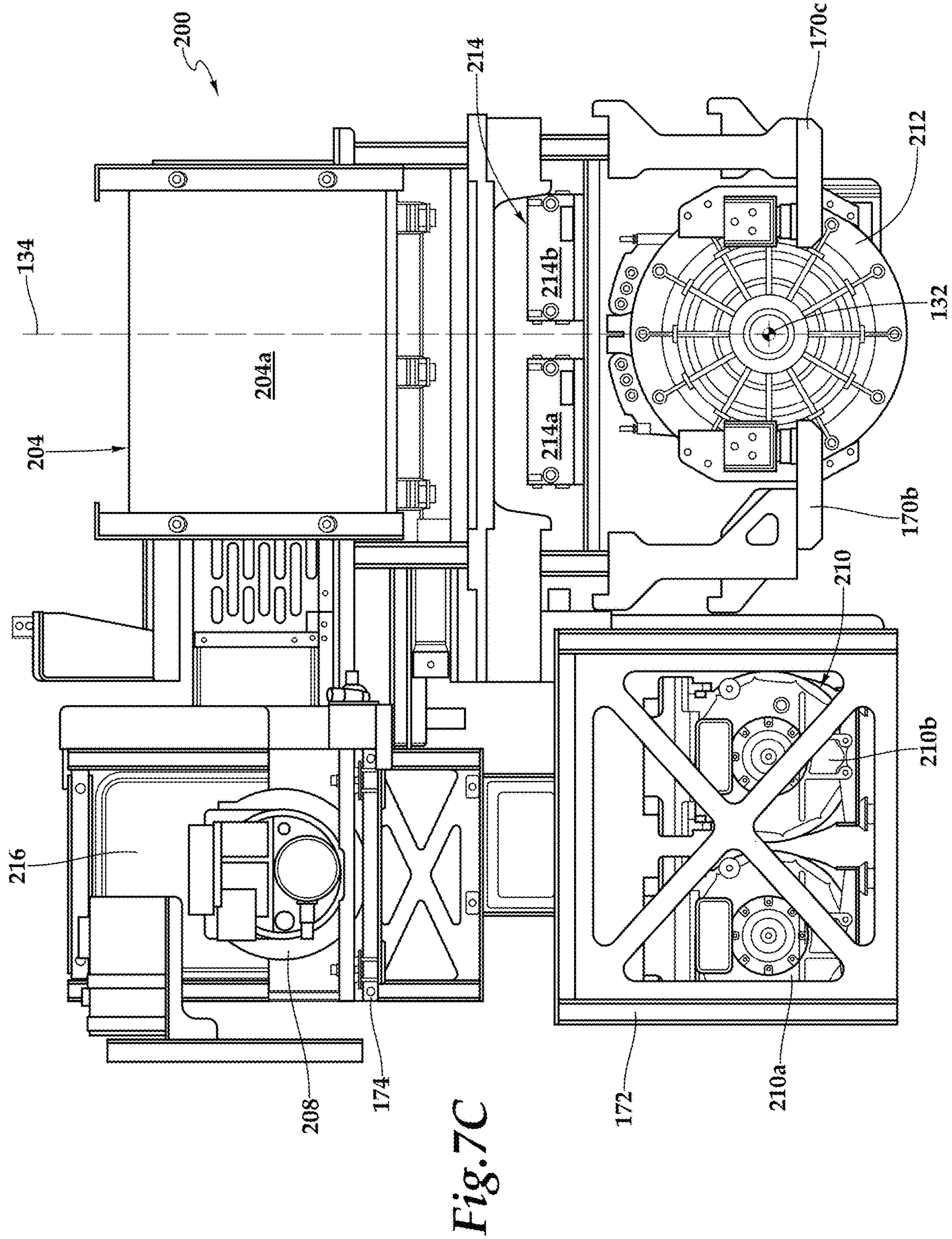
Figure 7D:
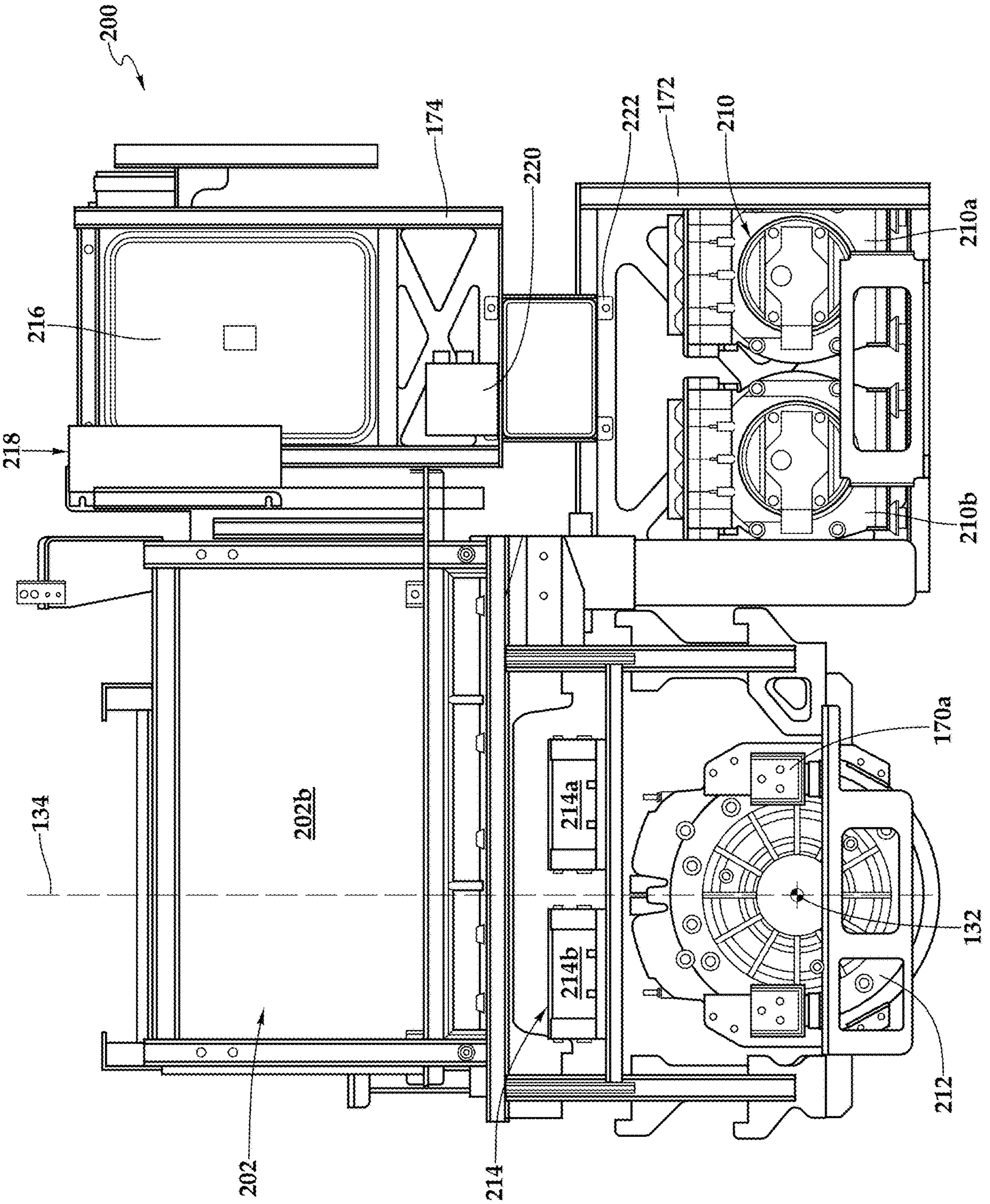
Figure 7E:
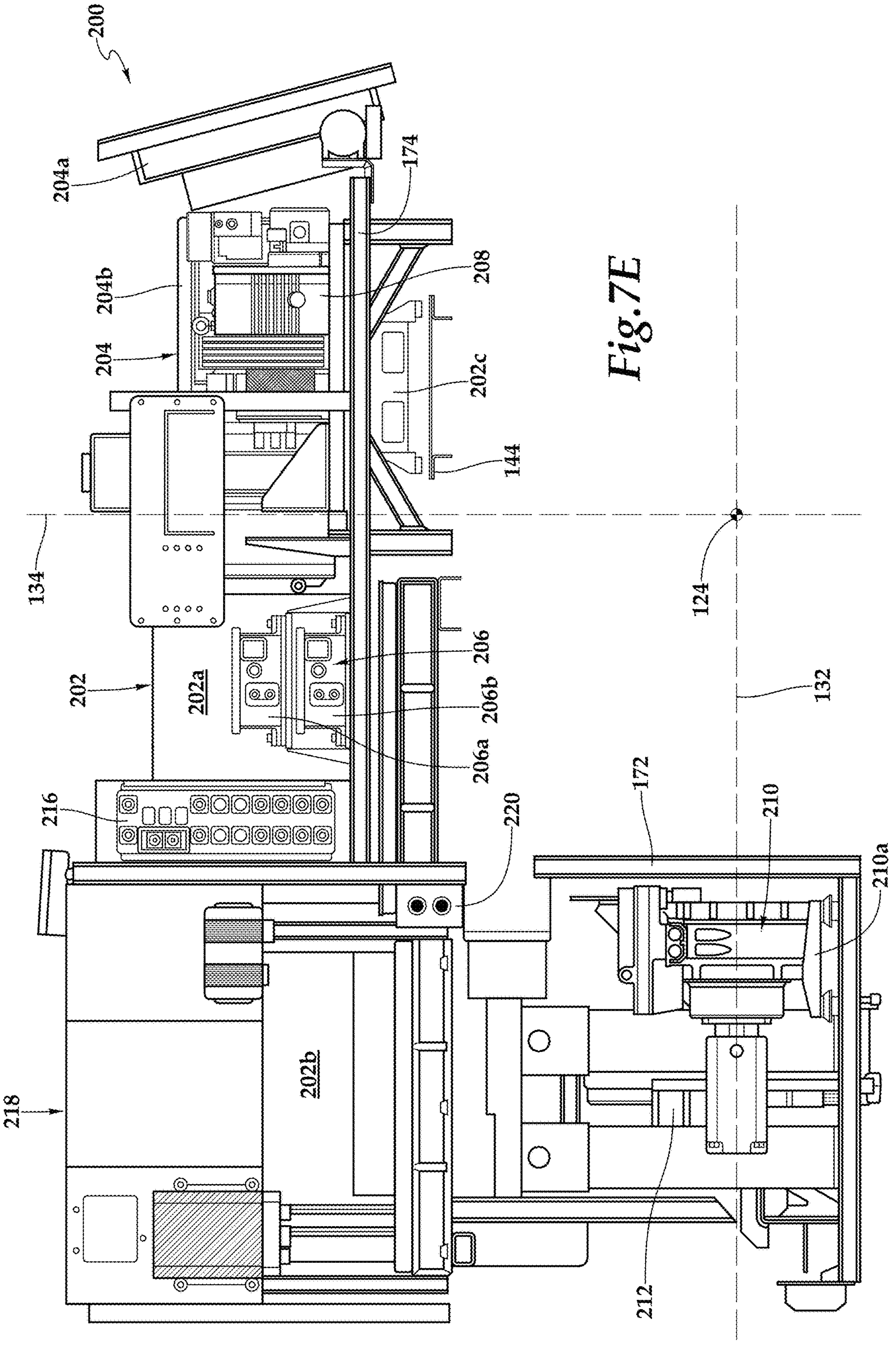
Figure 7E:
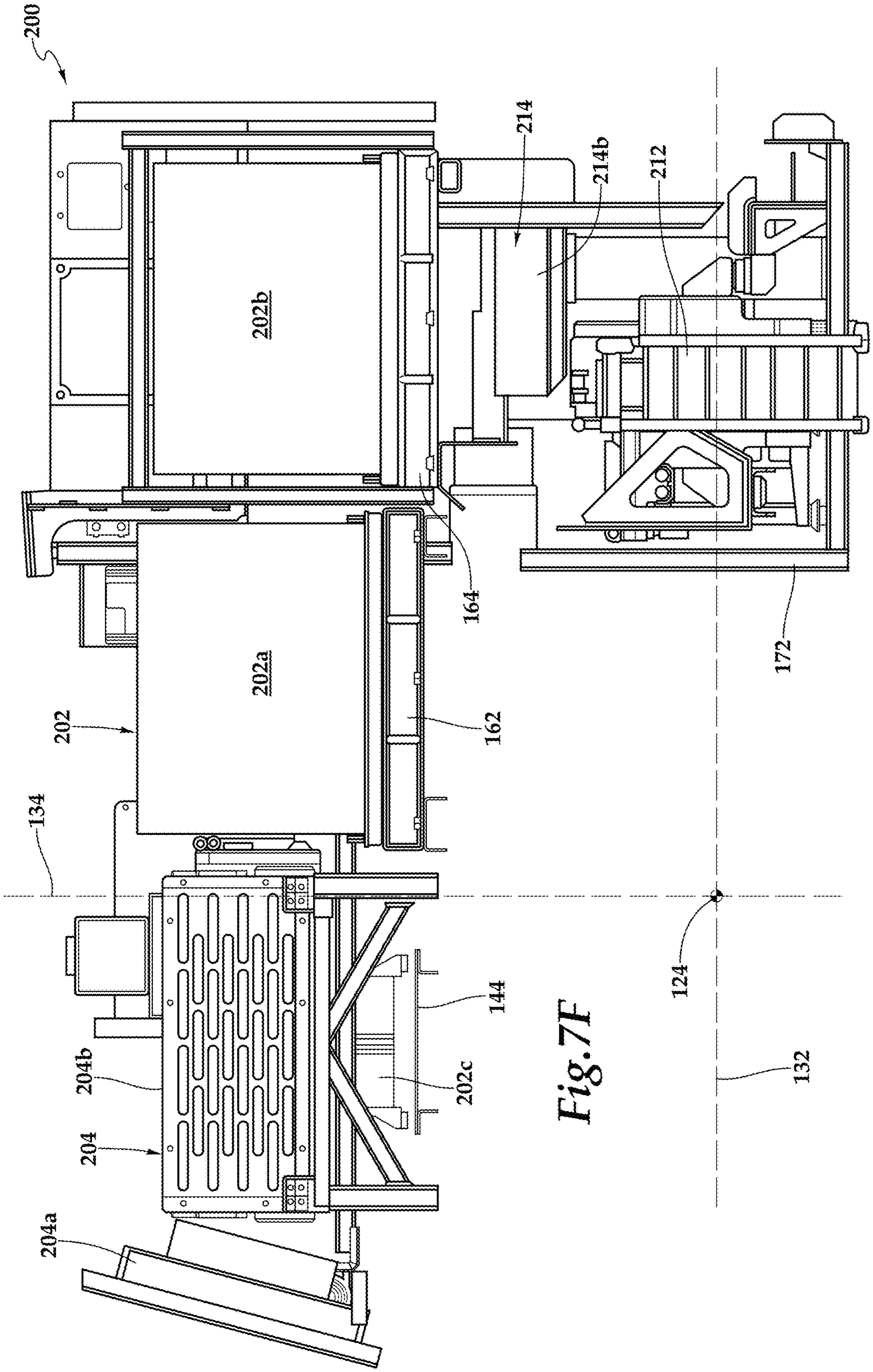

As best seen in FIG. 4D, the modified chassis 102 includes suitable bolt patterns such that additional frame members may be bolted on chassis 102 to support various electric components of deicing vehicle 100. It should be understood by those having ordinary skill in the art that even though FIG. 4D depicts bolt-on frame assemblies 160 attached to chassis 102 without supported components attached thereto, in some cases, certain supported components may be attached to bolt-on frame assemblies 160 prior to coupling bolt-on frame assemblies 160 to chassis 102. In the illustrated embodiment, the bolt-on frame assemblies 160 (see also FIG. 6) include forward battery module frame assembly 162 that is bolted on top of forward battery module frame members 146*a*, 146*b*; aft battery module frame assembly 164 that is bolted on top of aft battery module frame members 148*a*, 148*b*; right and left electric drive motor inverter bracket assemblies 166, 168 that are bolted on top of electric drive motor inverters frame members 152*a*, 152*b*; forward electric drive motor bracket assembly 170*a* that is bolted on top of electric drive motor frame member 154*a*; right aft electric drive motor frame bracket assembly 170*b* that is bolted to electric drive motor frame members 154*b*; left aft electric drive motor frame bracket assembly 170*c* that is bolted to electric drive motor frame members 154*c*; hydraulic pump system frame assembly 172 that is bolted to hydraulic pump system frame member 156 and upper laterally extending mounting rail 116*a*; and an upper frame assembly 174 that is bolted on top of upper laterally extending mounting rail 116*a*.

Figure 4E:
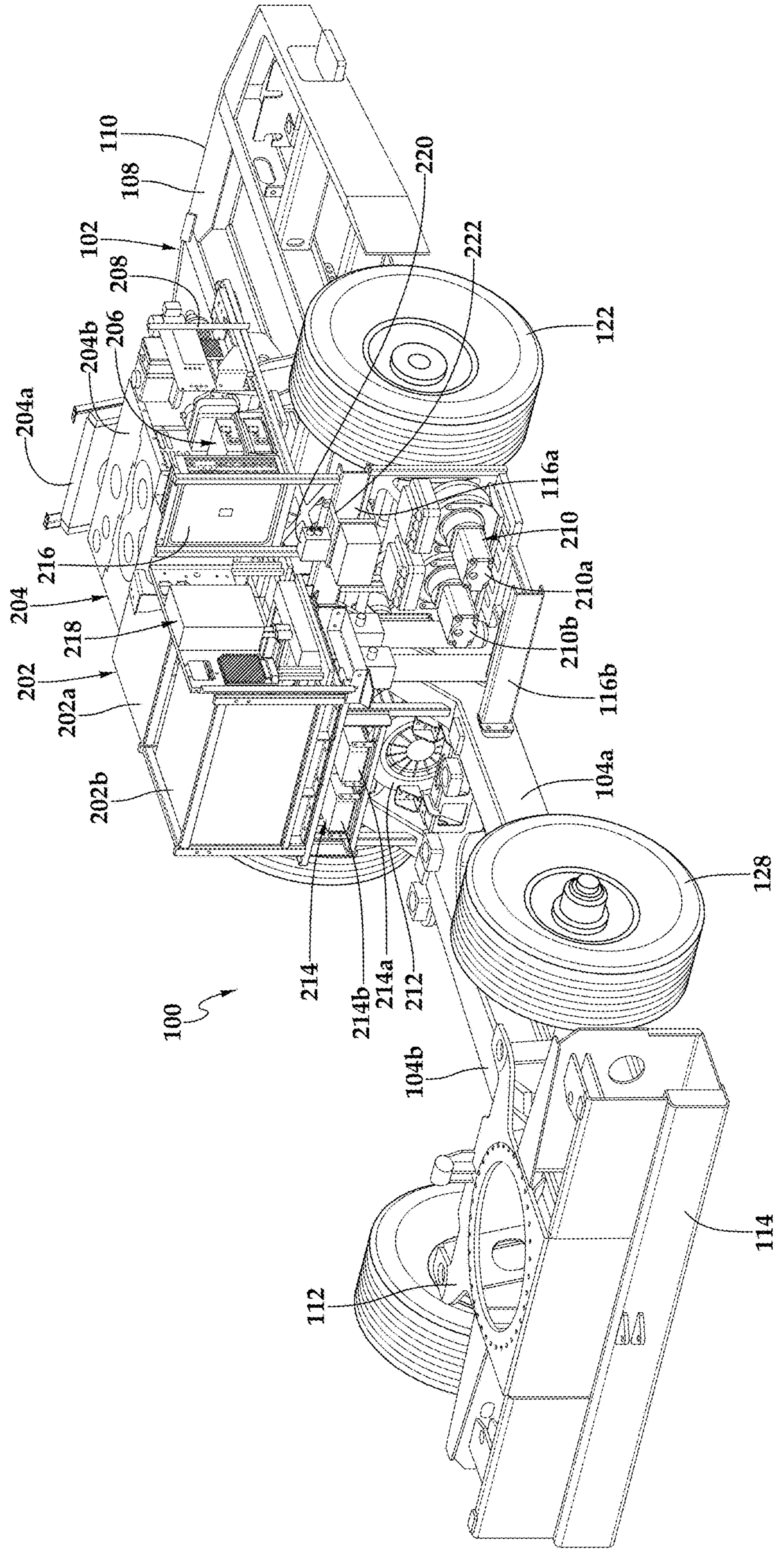
Figure 4F:
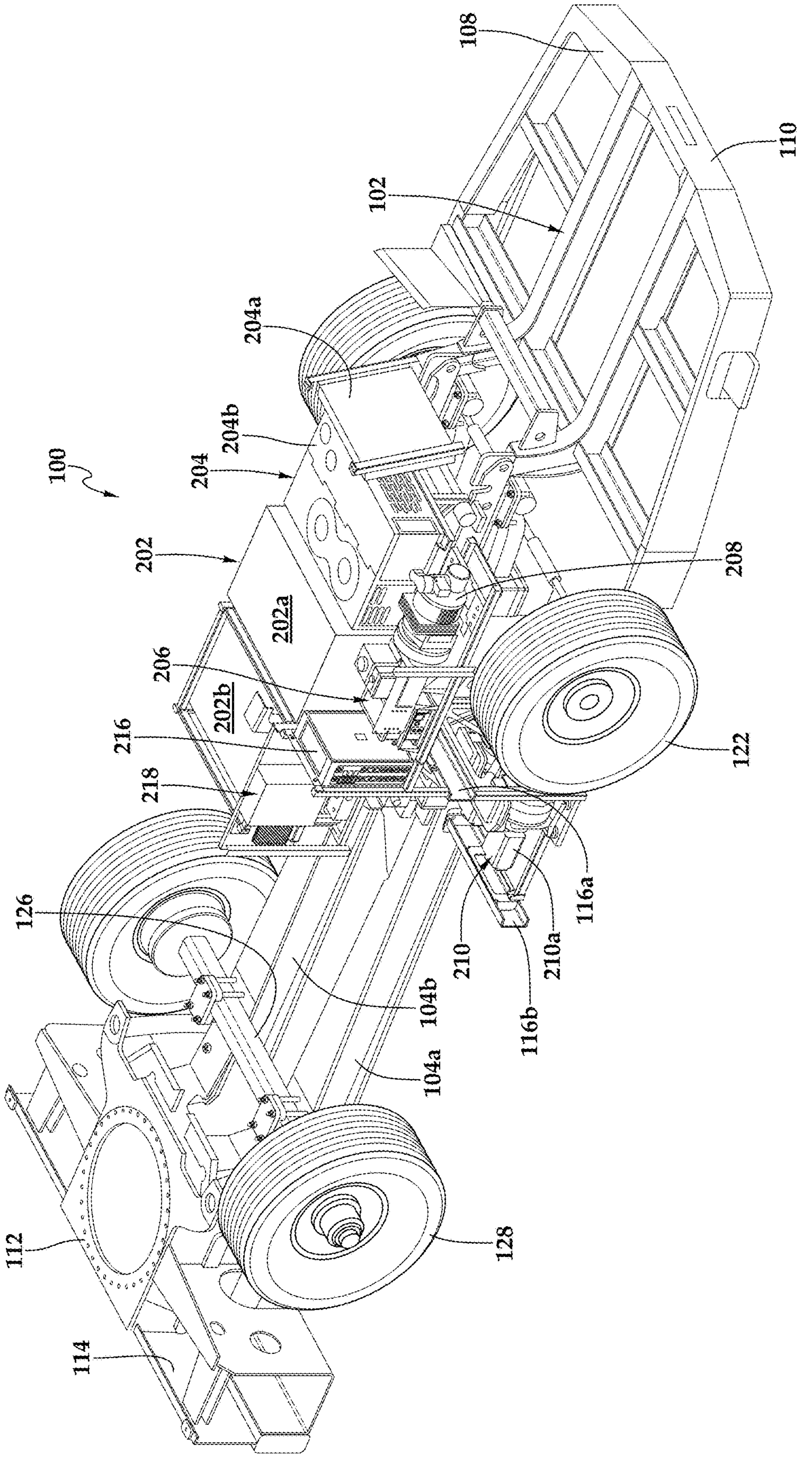

As best seen in FIGS. 4E-4F, deicing vehicle 100 includes a high voltage electric system 200 that is coupled to chassis 102 using weld-on frame members 140 and bolt-on frame assemblies 160. As discussed herein, the electric components of high voltage electric system 200 may be coupled to respective bolt-on frame assemblies 160 prior to or after bolt-on frame assemblies 160 have been attached to chassis 102. In some embodiments, high voltage electric system 200 may be bolted on a modified chassis 102 as one or more subassemblies of a kit. In the illustrated embodiment and referring additionally to FIGS. 7A-7F, high voltage electric system 200 includes a rechargeable battery system 202 depicted as having a rechargeable forward battery module 202*a*, a rechargeable aft battery module 202*b* and a charging unit 202*c*, a thermal management system 204 depicted as having a radiator 204*a* and a heat transfer unit 204*b*, a DC-to-DC converter system 206 depicted as having an upper DC-to-DC converter 206*a* and a lower DC-to-DC converter 206*b*, an air compressor 208, a hydraulic pump system 210 depicted as having a right hydraulic pump 210*a* and a left hydraulic pump 210*b*, an electric drive motor 212, an electric drive motor inverter system 214 depicted as having a right inverter 214*a* and a left inverter 214*b*, a power distribution unit 216, a vehicle control unit 218 and a cabin heating system 62 (see also FIG. 3).

In the illustrated embodiment, forward battery module 202*a* is coupled to chassis 102 using forward battery module frame assembly 162 that is bolted on top of forward battery module frame members 146*a*, 146*b*. An aft battery module 202*b* is coupled to chassis 102 using aft battery module frame assembly 164 that is bolted on top of aft battery module frame members 148*a*, 148*b*. Battery modules 202*a*, 202*b* may be high voltage battery modules providing, for example, 800 VDC and may be connected in parallel to power distribution unit 216. Battery modules 202*a*, 202*b* are positioned aft of thermal management system 204, lateral of DC-to-DC converter system 206, lateral of power distribution unit 216, above electric drive motor 212, above longitudinal centerline 132 of deicing vehicle 100 and above longitudinally extending beams 104*a*, 104*b*. Charging unit 202*c* is positioned below heat transfer unit 204*b* and forward of battery modules 202*a*, 202*b*. A portion of battery system 202 is positioned forward of axis of rotation 124 and a portion of battery system 202 is positioned aft of axis of rotation 124 and between axes of rotation 124, 130. Even though deicing vehicle 100 has been depicted and described as having a battery system including two battery modules, it should be understood by those having ordinary skill in the art that a deicing vehicle of the present disclosure could have a battery system including other numbers of battery modules either less than or greater than two. For example, for deicing vehicle having a heavy duty cycle, three or more battery modules may be used.

Heat transfer unit 204*b* is coupled to chassis 102 using heat transfer unit frame member 142 that is welded to longitudinally extending beams 104*a*, 104*b*. Heat transfer unit 204*b* is configured to thermally condition battery modules 202*a*, 202*b* including heating battery modules 202*a*, 202*b* during operating cycles and cooling battery modules 202*a*, 202*b* during charging cycles. Heat transfer unit 204*b* is operably coupled to battery system 202 via power distribution unit 216. Heat transfer unit 204*b* is positioned forward of battery modules 202*a*, 202*b*, aft of radiator 204*a*, lateral of air compressor 208, above charging unit 202*c*, above longitudinal centerline 132 of deicing vehicle 100 and above longitudinally extending beams 104*a*, 104*b*. A portion of heat transfer unit 204*b* is positioned forward of axis of rotation 124 and a portion of heat transfer unit 204*b* is positioned aft of axis of rotation 124 and between axes of rotation 124, 130.

DC-to-DC converter system 206 is coupled to chassis 102 using upper frame assembly 174 that is bolted on top of mounting rail 116*a*. DC-to-DC converter system 206 is operably coupled to battery system 202 via power distribution unit 216. DC-to-DC converter system 206 down converts the 800 VDC to one or more suitable voltages for operating lower voltage electric components such as vehicle control unit 218 and touchscreen monitor 64 which may operate at 24 VDC, 12 VDC, 5 VDC or other suitable voltage. DC-to-DC converter system 206 is positioned lateral of battery module 202*a*, forward of power distribution unit 216, aft of air compressor 208, aft of axis of rotation 124, between axes of rotation 124, 130 and outboard of right longitudinally extending beam 104*a*. Air compressor 208 is coupled to chassis 102 using upper frame assembly 174 that is bolted on top of mounting rail 116*a*. Air compressor 208 includes an electric motor that is operably coupled to battery system 202 via power distribution unit 216. Air compressor 208 is positioned lateral of heat transfer unit 204*b*, forward of power distribution unit 216, forward of DC-to-DC converter system 206, forward of axis of rotation 124 and outboard of right longitudinally extending beam 104*a*.

Hydraulic pump system 210 is coupled to chassis 102 using a mounting assembly depicted as hydraulic pump system frame assembly 172 that is bolted to mounting rail 116*a* and frame member 156 which is welded to mounting rail 116*b* with mounting rails 116*a*, 116*b* coupled to and extending laterally outboard from longitudinally extending beam 104*a*. Hydraulic pumps 210*a*, 210*b* each include an inverter and an electric motor that is operably coupled to battery system 202 via power distribution unit 216. Hydraulic pumps 210*a*, 210*b* provide high pressure hydraulic fluid to operate fluid pumps 46, the vehicle braking system and the positioning system of deicing vehicle 100 including tower 22, boom assembly 24, operator cabin 26 and arm 30, for example. Hydraulic pumps 210*a*, 210*b* are positioned aft of DC-to-DC converter system 206, power distribution unit and air compressor 208, lateral of electric drive motor 212 and longitudinal centerline 132 of deicing vehicle 100, aft of axis of rotation 124, between axes of rotation 124, 130 and outboard of right longitudinally extending beam 104*a*.

Electric drive motor 212 is coupled to chassis 102 using a mounting assembly depicted as bracket assembly 170*a* that is bolted on top of frame member 154*a*, bracket assembly 170*b* that is bolted to frame member 154*b* and bracket assembly 170*c* that is bolted to frame member 154*c* with frame members 154*b*, 154*c* welded respectively to longitudinally extending beams 104*a*, 104*b*. Electric drive motor 212 is the prime mover of deicing vehicle 100 and is operably coupled to battery system 202 via power distribution unit 216. Electric drive motor 212 has an axis of rotation that is coincident with longitudinal centerline 132 of deicing vehicle 100 such that electric drive motor 212 is aligned with front axle 120. Electric drive motor 212 is positioned below battery module 202*b*, lateral of hydraulic pump system 210, between longitudinally extending beams 104*a*, 104*b*, aft of axis of rotation 124 and between axes of rotation 124, 130.

Electric drive motor inverter system 214 is coupled to chassis using bracket assemblies 166, 168 that are bolted on top of frame members 152*a*, 152*b* which are welded to right brace assembly 150*a* and left brace assembly 150*b*. Inverters 214*a*, 214*b* are operably coupled to battery system 202 via power distribution unit 216 and are configured to convert the DC voltage from battery system 202 to AC voltage for electric drive motor 212. Electric drive motor inverter system 214 is positioned above electric drive motor 212, below battery module 202*b*, lateral of hydraulic pump system 210, between longitudinally extending beams 104*a*, 104*b*, aft of axis of rotation 124 and between axes of rotation 124, 130.

Power distribution unit 216 is coupled to chassis 102 using upper frame assembly 174 that is bolted on top of mounting rail 116*a*. Power distribution unit 216 is operably coupled to battery system 202 and distributes power from battery modules 202*a*, 202*b* to thermal management system 204, DC-to-DC converter system 206, air compressor 208, hydraulic pump system 210 and electric drive motor 212, for example. In addition, power distribution unit 216 distributes power from charging unit 202*c* to battery modules 202*a*, 202*b*. Power distribution unit 216 is positioned aft of DC-to-DC converter system 206, aft of air compressor 208, lateral of battery module 202*a*, aft of axis of rotation 124, between axes of rotation 124, 130 and outboard of right longitudinally extending beam 104*a*.

Vehicle control unit 218 is coupled to chassis 102 using upper frame assembly 174 that is bolted on top of mounting rail 116*a*. Vehicle control unit 218 receives inputs from vehicle controllers such as motion controllers 76*a*, 76*b* and deicing controllers 78*a*, 78*b* as well as from various sensors of deicing vehicle 100. In addition, vehicle control unit 218 provides commands for vehicle operations including commands to electric drive motor 212, the vehicle braking system and hydraulic pump system 210 to enable positioning and operation of spray system 32, for example. Vehicle control unit 218 is positioned aft of power distribution unit 216, aft of DC-to-DC converter system 206, aft of air compressor 208, lateral of battery module 202*a* and/or battery module 202*b*, aft of axis of rotation 124, between axes of rotation 124, 130 and outboard of right longitudinally extending beam 104*a*.

Deicing vehicle 100 includes a high voltage test point 220 that provides a protected location to test for voltage within high voltage electric system 200. High voltage test point 220 is a safety device used, for example, to validate that battery system 202 has been disconnected from the other elements within high voltage electric system 200 to assure that no voltage is present within high voltage electric system 200 prior to performing maintenance or other operations relating to any of the components of high voltage electric system 200. In the illustrated embodiment, high voltage test point 220 is coupled to upper frame assembly 174 via a mounting bracket 222. High voltage test point 220 is positioned above hydraulic pumps 210*a*, 210*b*, aft of DC-to-DC converter system 206, power distribution unit and air compressor 208, lateral of electric drive motor 212 and longitudinal centerline 132 of deicing vehicle 100, aft of axis of rotation 124, between axes of rotation 124, 130 and outboard of right longitudinally extending beam 104*a*.

Figure 8:
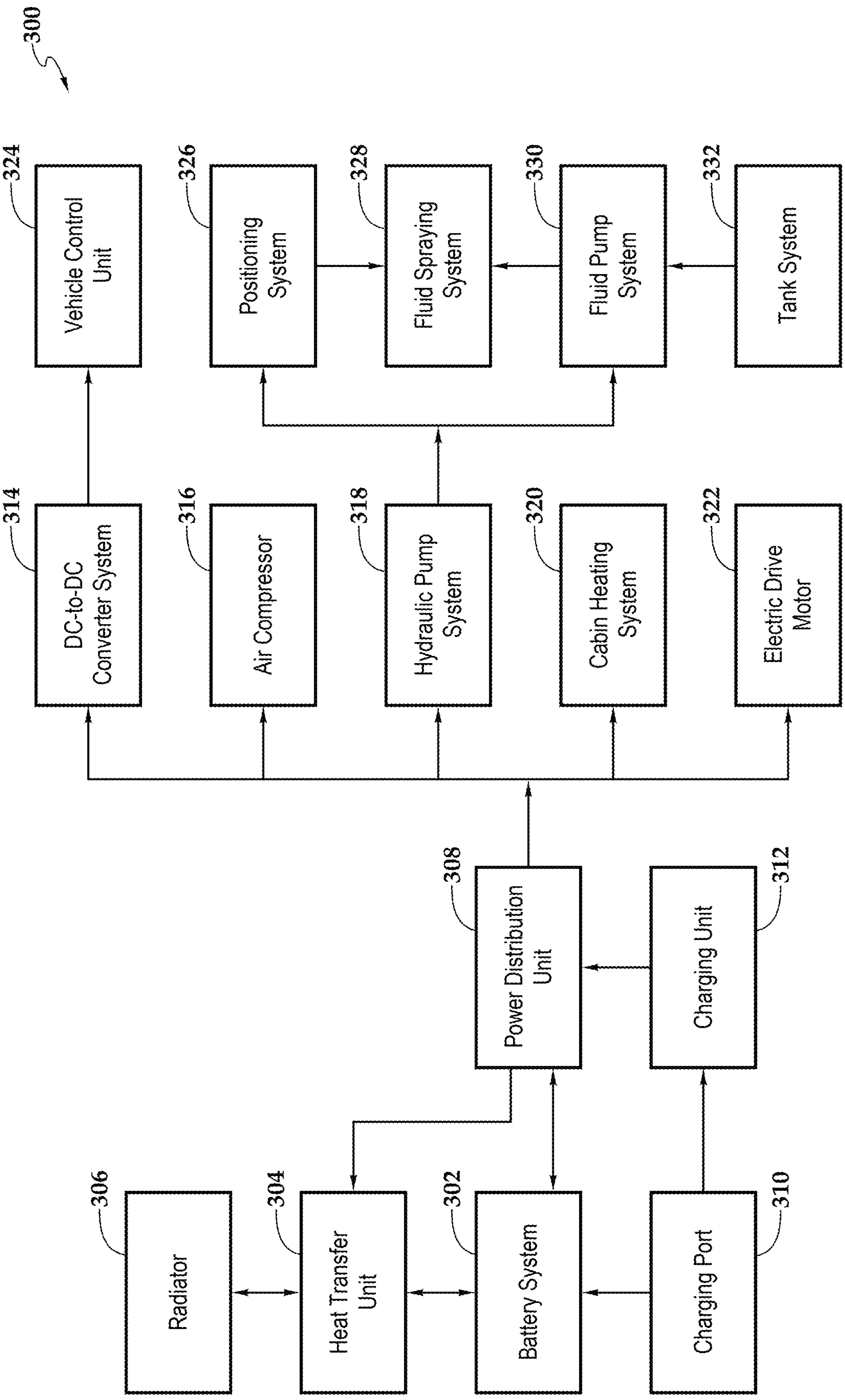
FIG. 8 is a systems diagram of an electrically operated aircraft deicing vehicle in accordance with embodiments of the present disclosure.

Referring additionally to FIG. 8 of the drawings, a systems diagram of a deicing vehicle 300 will be discussed. It should be understood by those having ordinary skill in the art that deicing vehicle 300 is representative of deicing vehicles 10, 100 discussed herein. In the illustrated embodiment, deicing vehicle 300 includes a rechargeable battery system 302 that may include one or more rechargeable battery modules that provide power for the electric components of deicing vehicle 300. Battery system 302 is thermally conditioned by a thermal management system that heats the battery modules during operating cycles, cools the battery modules during charging cycles and that includes heat transfer unit 304 and radiator 306. Heat transfer unit 304 receives power from battery system 302 via a power distribution unit 308. The battery modules are charged via a charging port 310 that enables DC fast charging the battery modules via a direct connection or AC charging of the battery modules via charging unit 312 and power distribution unit 308. In addition, power distribution unit 308 distributes power from battery system 302 to a DC-to-DC converter system 314, an air compressor 316, a hydraulic pump system 318, a cabin heating system 320 and an electric drive motor 322. DC-to-DC converter system 314 down converts the high voltage DC to one or more lower DC voltages to power, for example, a vehicle control unit 324. Hydraulic pump system 318 is in fluid communication with a variety of hydraulically operated systems of deicing vehicle 300 including, for example, a positioning system 326 that may include a rotatable tower, a telescoping boom, a rotatable operator cabin and a telescoping arm that collectively position a fluid spraying system 328 relative to, for example, an aircraft wing requiring deicing. In addition, hydraulic pump system 318 is in fluid communication with a fluid pump system 330 that provides high pressure deicing fluid from a tank system 332 to fluid spraying system 328.

Figure 9:
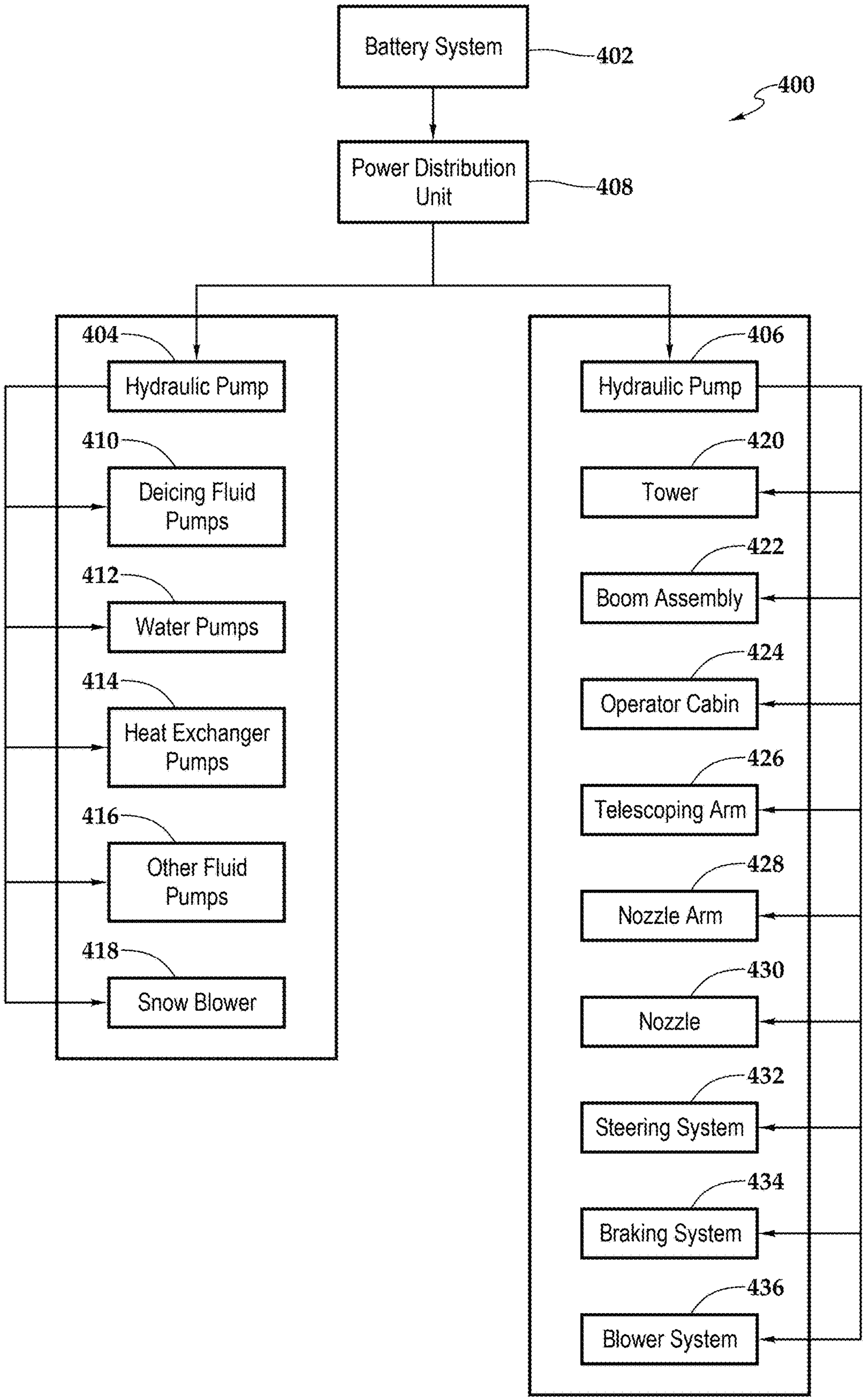
FIG. 9 is a systems diagram of a hydraulic system for an electrically operated aircraft deicing vehicle in accordance with embodiments of the present disclosure.

Referring additionally to FIG. 9 of the drawings, a systems diagram of a hydraulic system 400 for a deicing vehicle, such as deicing vehicles 10, 100, 300, will now be discussed. Hydraulic system 400 includes a rechargeable battery system 402 that provides power for hydraulic pumps 404, 406 via a power distribution unit 408. Hydraulic pumps 404, 406 are independent of one another and support specific hydraulically powered devices via independent hydraulic networks allowing each of hydraulic pumps 404, 406 to be operated at a desired speed depending upon the demands of the deicing vehicle. Hydraulic pumps 404, 406 may share a common hydraulic fluid reservoir or may have independent hydraulic fluid reservoirs associated therewith. In general, hydraulic pump 404 supports various hydraulically powered fluid pumps of the deicing vehicle and hydraulic pump 406 supports the movement of various vehicle systems of the deicing vehicle.

More specifically, in the illustrated embodiment, hydraulic pump 404 supports the deicing fluid pumps 410 associated with each of the fluid tanks of the tank system, one or more water pumps 412, one or more heat exchanger pumps 414 as well as any other fluid pumps 416 used by the deicing vehicle including one or more rotary pumps and/or one or more circulation pumps. In addition, hydraulic pump 404 may support a snow blower system 418. In the illustrated embodiment, hydraulic pump 406 supports the positioning system associated with deicing operations including, the hydraulic control systems associated with rotating tower 420; raising, lowering, extending and retracting boom assembly 422; rotating operator cabin 424; raising, lowering, extending and retracting telescoping arm 426; raising, lowering, extending and retracting nozzle arm 428; and tilting nozzle 430. In addition, hydraulic pump 406 may also support the steering system 432 of the deicing vehicle, the braking system 434 of the deicing vehicle and the blower system 436 associated with a diesel burner of the deicing vehicle. Using multiple variable-speed electrically operated hydraulic pumps 404, 406 offers several benefits over prior hydraulic systems for deicing vehicles including greater flexibility, efficiency, reliability and adaptability. For example, hydraulic pumps 404, 406 can be individually adjusted to different speeds, allowing for more precise control of flow rates and pressures. Hydraulic pumps 404, 406 can be set to run at optimal speeds for different loads, reducing energy consumption and pump wear. Hydraulic pumps 404, 406 can be turned on and off as needed to meet varying demand, reducing energy usage when demand is low.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An electrically operated aircraft deicing vehicle comprising:

a chassis including first and second longitudinally extending beams;

front and rear axles coupled to the chassis;

a positioning system coupled to the chassis;

a fluid spraying system coupled to the positioning system;

a fluid tank system coupled to the chassis, the fluid tank system in fluid communication with the fluid spraying system;

a rechargeable battery system coupled to the chassis, the battery system including one or more battery modules and a charging unit;

an electric drive motor operably coupled to the battery system, the electric drive motor positioned aft of the front axle and between the first and second longitudinally extending beams, the electric drive motor operably coupled to the front axle to rotate one or more front wheels;

a hydraulic pump system operably coupled to the battery system, the hydraulic pump system operably coupled to the positioning system to maneuver the fluid spraying system; and a heat transfer unit coupled to the chassis, the heat transfer unit positioned forward of the one or more battery modules and configured to thermally condition the one or more battery modules.

2. The deicing vehicle as recited in claim 1 wherein, at least a portion of the battery system is positioned forward of and above the front axle.

3. The deicing vehicle as recited in claim 1 further comprising a mounting assembly for the electric drive motor, the mounting assembly including a first bracket coupled to the first longitudinally extending beam and a second bracket coupled to the second longitudinally extending beam.

4. The deicing vehicle as recited in claim 1 wherein, the electric drive motor is positioned below the battery system.

5. The deicing vehicle as recited in claim 1 wherein, the electric drive motor has an axis of rotation that is positioned along a longitudinal centerline of the deicing vehicle.

6. The deicing vehicle as recited in claim 1 further comprising a mounting assembly for the hydraulic pump system, the mounting assembly coupled to the first longitudinally extending beam.

7. The deicing vehicle as recited in claim 1 wherein, the hydraulic pump system is positioned outboard of the first longitudinally extending beam, between the front and rear axles and lateral of the electric drive motor.

8. The deicing vehicle as recited in claim 1 wherein, the hydraulic pump system includes one or more hydraulic pumps each having an electric motor operably coupled to the battery system.

9. The deicing vehicle as recited in claim 1 wherein, the heat transfer unit is configured to heat the one or more battery modules during operating cycles and cool the one or more battery modules during charging cycles.

10. The deicing vehicle as recited in claim 1 wherein, the charging unit is positioned below the heat transfer unit.

11. The deicing vehicle as recited in claim 1 wherein, the positioning system further comprises a rotatable tower coupled to the chassis, a telescoping boom coupled to the tower, an operator cabin coupled to the telescoping boom and a telescoping arm coupled to the operator cabin.

12. The deicing vehicle as recited in claim 11 wherein, the positioning system further comprises a turret coupled to the telescoping boom; and wherein, the operator cabin is mounted on the turret.

13. The deicing vehicle as recited in claim 11 further comprising a heating system at least partially disposed within the operator cabin, the heating system operably coupled to the battery system.

14. The deicing vehicle as recited in claim 1 wherein, the fluid tank system includes a plurality of fluid tanks.

15. The deicing vehicle as recited in claim 1 wherein, the fluid tank system includes at least one deicing fluid tank and at least one anti-icing fluid tank.

16. The deicing vehicle as recited in claim 1 further comprising a fluid pump system configured to provide fluid from the fluid tank system to the fluid spraying system.

17. The deicing vehicle as recited in claim 16 wherein, the fluid pump system includes one or more fluid pumps each having a hydraulic motor operably coupled to the hydraulic pump system.

18. The deicing vehicle as recited in claim 1 further comprising a radiator positioned forward of and in fluid communication with the heat transfer unit.

19. The deicing vehicle as recited in claim 1 further comprising:

an air compressor positioned forward of the front axle, the air compressor including an electric motor operably coupled to the battery system;

a power distribution unit positioned lateral of and operably coupled to the battery system; and a DC-to-DC converter system positioned between the air compressor and the power distribution unit.

20. The deicing vehicle as recited in claim 1 further comprising a vehicle control unit positioned lateral of the battery system.

* * * * *